United States Patent
Nawaz

(10) Patent No.: US 10,105,687 B1
(45) Date of Patent: Oct. 23, 2018

(54) HETEROSTRUCTURED $Bi_2S_3$—ZNS PHOTOCATALYSTS AND METHODS THEREOF

(71) Applicant: IMAM ABDULRAHMAN BIN FAISAL UNIVERSITY, Dammam (SA)

(72) Inventor: Muhammad Nawaz, Dammam (SA)

(73) Assignee: Imam Abdulrahman Bin Faisal University, Dammam (SA)

(*) Notice: Subject to any disclaimer, the term of this patent is extended or adjusted under 35 U.S.C. 154(b) by 0 days.

(21) Appl. No.: 15/685,671

(22) Filed: Aug. 24, 2017

(51) Int. Cl.
| | |
|---|---|
| *B01J 23/06* | (2006.01) |
| *B01J 23/18* | (2006.01) |
| *B01J 37/08* | (2006.01) |
| *C01B 3/02* | (2006.01) |
| *B01J 27/04* | (2006.01) |
| *B01J 35/00* | (2006.01) |
| *B01J 37/03* | (2006.01) |
| *B01J 19/12* | (2006.01) |
| *C01B 3/06* | (2006.01) |

(Continued)

(52) U.S. Cl.
CPC ............ *B01J 27/04* (2013.01); *B01J 19/127* (2013.01); *B01J 35/004* (2013.01); *B01J 37/031* (2013.01); *B82Y 30/00* (2013.01); *B82Y 40/00* (2013.01); *C01B 3/06* (2013.01)

(58) Field of Classification Search
CPC ... B01J 23/06; B01J 23/18; B01J 27/04; B01J 19/127; B01J 35/004; B01J 35/023; B01J 37/031; B01J 37/038; B01J 37/08; B82Y 30/00; B82Y 40/00; C01B 3/02; C01B 3/06

USPC ..... 502/5, 216; 423/644, 648.1; 204/157.52; 205/637; 977/700
See application file for complete search history.

(56) References Cited

U.S. PATENT DOCUMENTS

| | | | |
|---|---|---|---|
| 8,936,734 B2 | 1/2015 | Landry et al. | |
| 2004/0007169 A1* | 1/2004 | Ohtsu | B82Y 30/00 117/84 |

(Continued)

FOREIGN PATENT DOCUMENTS

| | | |
|---|---|---|
| CN | 101947462 A | 1/2011 |
| CN | 104998662 A | 10/2015 |

OTHER PUBLICATIONS

T. J. Entradas et al., "Synthesis of titanate nanofibers co-sensitized with ZnS and Bi2S3 nanocrystallites and their application on pollutants removal." Materials Research Bulletin 72, pp. 20-28. (Year: 2015).*

(Continued)

*Primary Examiner* — Patricia L. Hailey
(74) *Attorney, Agent, or Firm* — Oblon, McClelland, Maier & Neustadt, L.L.P.

(57) ABSTRACT

A photocatalyst in the form of chloroplast-like heterostructures of $Bi_2S_3$—ZnS is disclosed. Additionally, methods for producing the chloroplast-like heterostructures of $Bi_2S_3$—ZnS with controlled morphology, as well as methods for the photocatalytic production of hydrogen gas under visible light irradiation employing the chloroplast-like heterostructures of $Bi_2S_3$—ZnS are disclosed.

20 Claims, 19 Drawing Sheets

(51) Int. Cl.
*B82Y 30/00* (2011.01)
*B82Y 40/00* (2011.01)

(56) References Cited

U.S. PATENT DOCUMENTS

| | | | |
|---|---|---|---|
| 2010/0167914 A1* | 7/2010 | Anderson | B01J 21/063 502/80 |
| 2011/0193024 A1* | 8/2011 | Wong | B82Y 30/00 252/301.4 P |
| 2014/0174905 A1* | 6/2014 | Landry | B01J 27/0576 204/157.5 |

OTHER PUBLICATIONS

Dan-Ni Xiong et al., "Facile ion-exchange synthesis of mesoporous Bi2S3/ZnS nanoplate with high adsorption capability and photocatalytic activity." Journal of Colloid and Interface Science 464, pp. 103-109. (Year: 2015).*

Xioming Gao et al., "2D double-layer-tube-shaped structure Bi2S3/ZnS heterojunction with enhanced photocatalytic activities." Physica B 474, pp. 81-89. (Year: 2015).*

H. Benattou et al., "Thin film bismuth (III) sulfide/zinc sulfide composites deposited by spray pyrolysis." Results in Physics 7, pp. 3847-3852. (Year: 2017).*

Mohammad Raouf Hosseini, et al., "Recent achievements in the microbial synthesis of semiconductor metal sulfide nanoparticles." Materials Science in Semiconductor Processing 40, pp. 293-301. (Year: 2015).*

Man Luo et al., "General strategy for one-pot synthesis of metal sulfide hollow spheres with enhanced photocatalytic activity." Applied Catalysis B: Environmental 125, pp. 180-188. (Year: 2012).*

Fengzhen Liu et al., "Bi2S3—ZnS/graphene complexes: Synthesis, characterization, and photoactivity for the decolorization of dyes under visible light." Materials Science in Semiconductor Processing 34, pp. 104-108 (Year: 2015).*

Wu, Zhudong; Chen, Linlin; Xing, Chaosheng; Jiang, Deli; Xie. Jimin; and Chen, Min. "Controlled synthesis of Bi2S3/ZnS microspheres by an in situ ion-exchange process with enhanced visible light photocatalytic activity." Dalton Trans. (42), Jun. 12, 2013, 12980-12988.

Xitao, Wang; Rong, Lv; and Kang, Wang. "Synthesis of ZnO@ZnS—Bi2S3 core-shell nanorod grown on reduced graphene oxide sheets and its enhanced photocatalytic performance.". Mater. Chem. A, Mar. 11, 2014, 8304-8313.

* cited by examiner

HETEROSTRUCTURED $Bi_2S_3$—ZNS PHOTOCATALYSTS AND METHODS THEREOF

BACKGROUND OF THE DISCLOSURE

Technical Field

The present disclosure relates to a heterostructured $Bi_2S_3$—ZnS photocatalyst having a chloroplast-like structure, a method for producing the heterostructured $Bi_2S_3$—ZnS photocatalyst with controlled morphology, and a method for producing hydrogen gas employing the heterostructured $Bi_2S_3$—ZnS photocatalyst.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

The use of solar light driven semiconductors for hydrogen production by splitting water is one of the important ways to fulfill the future energy requirement [A. Kudo, Int. J. Hydrogen Energy 32 (2007) 2673-2678; and K. Maeda, K. Teramura, D. L. Lu, T. Takata, N. Saito, Y. Inoue, Nature 2006 (440) (2006) 295; and K. Maeda, K. Domen, J. Phys. Chem. C 111 (2007) 7851-7861; and Z. G. Zou, J. H. Ye, K. Sayama, H. Arakawa, Nature 414 (2001) 625-667; and S. W. Bae, S. M. Ji, S. J. Hong, J. W. Jang, J. S. Lee, Int. J. Hydrogen Energy 34 (2009) 3243-3249.]. It is generating increased interest as an environmentally sound fuel source and a facile route for hydrogen production. Many efforts have been devoted to seeking potential photocatalysts. However, most of the reported catalysts exhibit limited photocatalytic activities under visible light or are only active in UV light. Thus, there is a need to develop photocatalysts which can show promising activity under visible light. Metal sulfides are often considered important photocatalysts for hydrogen production under visible light [M. Sathish, B. Viswanathan, R. P. Viswanath, Int. J. Hydrogen Energy 31 (2006) 891-898; C. J. Xing, Y. J. Zhang, W. Yan, L. J. Guo, Int. J. Hydrogen Energy 31 (2006) 2018-2024; and S. H. Shen, L. Zhao, L. J. Guo, Int. J. Hydrogen Energy 33 (2008) 4501-4510; and R. M. Navarro, F. del Valle, J. L. G. Fierro, Int. J. Hydrogen Energy 33 (2008) 4265-4273; and N. Sahu, S. N. Upadhyay, A. S. K. Sinha, Int. J. Hydrogen Energy 34 (2009) 130-137; I. Tsuji, H. Kato, A. Kudo, Chem. Mater. 18 (2006) 1969-1975; X. W. Wang, G. Liu, Z. G. Chen, F. Li, G. Q. Lu, H. M. Cheng, Electrochem. Commun. 11 (2009) 1174-1178; and K. Zhang, D. W. Jing, C. J. Xing, L. J. Guo, Int. J. Hydrogen Energy 32 (2007) 4685-4691; and J. S. Jang, H. G. Kim, U. A. Joshi, J. W. Jang, J. S. Lee, Int. J. Hydrogen Energy 33 (2008) 5975-5980; I. Tsuji, H. Kato, A. Kudo, Angew. Chem. Int. Ed. 44 (2005) 3565-3568; and L. Chen, J. He, Q. Yuan, Y. Liu, C.-T. Au, S.-F. Yin, J. Mater. Chem. A 3 (2015) 1096-1102; and L. Chen, J. He, Q. Yuan, Y.-W. Zhang, F. Wang, C.-T. Au, S.-F. Yin, RSC Adv. 5 (2015) 33747-33754; and Jie He, Lang Chen, Fu Wang, Ying Liu, P. Chen, C.-T. Au, S.-F. Yin, Chem Sus Chem 9 (6) (2016) 624-6301

Recently, the synthesis of heterostructured nanomaterials with controlled morphologies and sizes has been receiving increased attention as a result of their distinctive properties and prospective applications [X. G. Peng, L. Manna, W. D. Yang, J. Wickham, E. Scher, A. Kadavanich, A. P. Alivisatos, Nature 404 (2000) 59-61; and J. Hu, T. W. Odom, C. M. Lieber, Acc. Chem. Res. 32 (1999) 435-445; and F. Kim, S. Kwan, J. Akana, P. D. Yang, J. Am. Chem. Soc. 123 (2001) 4360-4361; and A. P. Alivisatos, Science 271 (1996) 933-937.]. The heterostructure semiconductors with controlled morphologies and sizes can modulate the properties of materials with potential applications in nanodevices, biomedicine and photocatalysis [A. P. Alivisatos, Nat. Biotechnol. 22 (2004) 47-52; and D. Y. Wang, A. L. Rogach, F. Caruso, Nano Lett. 2 (2002) 857-861; S. W. Lam, K. Chiang, T. M. Lim, R. C. Amal, G. K. Low, Appl. Catal. B 72 (2007) 363-372; and T. Tabakova, V. Idakiev, D. Andreeva, I. Mitov, Appl. Catal. A 202 (2000) 91-97.]. Numerous kinds of semiconductor-based heterostructures have been designed and fabricated owing to their various potential applications. Therefore, the ability to prepare the catalysts with controlled morphologies and crystal size has become an important topic [S. H. Yu, M. Antonietti, H. Colfen, J. Hartmann, Nano Lett. 3 (2003) 379-382; and V. F. Puntes, K. M. Krishnan, A. P. Alivisatos, Science 291 (2001) 2115.].

The self-assembly of nanomaterials is considered an efficient route to the construction of functional materials having diverse morphologies. Thus, the surfactant assisted synthesis by self-assembly of nanomaterials is an important way to control the morphologies of the nanomaterial [V. Sazonova, Y. Yaish, H. Ustunel, D. Roundy, A. Tomas, L. Arias, Paul McEuen, Nature 431 (2004) 284-287; and W. G. Lu, P. X. Gao, W. B. Jian, Z. L. Wang, J. Y. Fang, J. Am. Chem. Soc. 126 (2004) 14816-14821.].

$Bi_2S_3$ is an ideal semiconductor for solar cells and photodetectors in the visible region due to its narrow band gap (1.3-1.7 eV) [J. Lu, Q. Han, X. Yang, L. Lu, X. Wang, Mater. Lett. 61 (2007) 3425-3428; and Y. Yu, W. T. Sun, Mater. Lett. 63 (2009) 1917-1920.]. ZnS is also an important semiconductor with a direct wide band gap energy of 3.66 eV. However, due to this wide band gap energy, its light absorption ability is restricted to the UV region only [X. Fang, T. Zhai, U. Gautam, L. Li, L. Wu, Y. Bando, D. Golberg, Prog. Mater. Sci. 56 (2011) 175-287.].

In view of the forgoing, one object of the present disclosure is to provide heterostructure chloroplast-like morphologies of $Bi_2S_3$—ZnS as a photocatalyst. A second objective of the present disclosure is to provide a facile solvothermal method to synthesize the chloroplast-like heterostructures of $Bi_2S_3$—ZnS for example with the aid of a surfactant, such as polyvinyl pyrrolidone (PVP) and by regulating the concentration of the surfactant in the reaction mixture and further by regulating reaction time. A further objective of the present disclosure is to provide a method employing the chloroplast-like heterostructures of $Bi_2S_3$—ZnS in their application as photocatalysts for the photocatalytic production of hydrogen gas under visible light irradiation.

BRIEF SUMMARY OF THE DISCLOSURE

According to a first aspect, the present disclosure relates to a photocatalyst comprising i) bismuth (III) sulfide, and ii) zinc sulfide, wherein the photocatalyst has a chloroplast-like morphology with an average length of 500-3000 nm and an average width of 100-500 nm and an average ratio of length to width that is greater than 2.0.

In one embodiment, the atomic ratio of bismuth to zinc is in a range of 0.1-5.0.

In one embodiment, the atomic ratio of sulfur to bismuth is in a range of 1-10.

In one embodiment, the phototcatalyst is monodisperse and has a coefficient of variation of less than 30%.

In one embodiment, the molar ratio of bismuth (III) sulfide to zinc sulfide is in a range of 1:10 to 10:1.

According to a second aspect, the present disclosure relates to a method of forming the photocatalyst, the method comprising i) mixing a bismuth trihalide, a zinc salt, and a thiourea organosulfur compound in a solvent in the presence of polyvinyl pyrrolidone thereby forming a reaction slurry, and ii) heating the reaction slurry in an autoclave at a temperature of 100-300° C. for a time period of 1-30 hours thereby forming the photocatalyst, wherein the average ratio of length to width of the photocatalyst increases as an amount of polyvinyl pyrrolidone present in the reaction slurry increases.

In one embodiment, the solvent is ethylene glycol.

In one embodiment, the bismuth triahalide is bismuth (III) chloride, the zinc salt is zinc acetate dihydrate, and the thiourea organosulfur compound is thiourea of formula $SC(NH_2)_2$.

In one embodiment, the heating is performed at a temperature of 180-220° C. for a time period of 16-24 hours.

In one embodiment, 1-50 g of polyvinyl pyrrolidone is present per liter of the reaction slurry.

In one embodiment, the molar ratio of the thiourea organosulfur compound to the bismuth trihalide is in a range of 2-10.

In one embodiment, the molar ratio of the zinc salt to the bismuth trihalide is in a range of 1.25-5.

In one embodiment, 5-25 g of polyvinyl pyrrolidone is present per liter of the reaction slurry and the average ratio of length to width of the photocatalyst is in a range of 2.5-5.0.

According to a third aspect, the present disclosure relates to a method of forming hydrogen gas, the method comprising i) contacting an aqueous solution with the photocatalyst of claim 1, thereby forming a reaction mixture, and ii) irradiating the reaction mixture with a light source having a wavelength of 300-800 nm, thereby forming hydrogen gas.

In one embodiment, 0.1-5.0 grams of the photocatalyst is present per liter of the reaction mixture.

In one embodiment, the irradiating is performed in the presence of 0.1-1.0 moles of a hole scavenger or sacrificial agent per litter of the reaction mixture and an absence of oxygen.

In one embodiment, the hole scavenger or sacrificial agent is at least one selected from the group consisting of $Na_2S$ and $Na_2SO_3$.

In one embodiment, hydrogen gas is formed at a rate of 50-300 μmol $h^{-1}$.

In one embodiment, the method further comprises i) recovering the photocatalyst after the hydrogen gas is produced, and ii) recycling the recovered photocatalyst in at least two reaction cycles.

In one embodiment, the average rate of hydrogen gas formation decreases by less than 30% after the photocatalyst is recycled in at least two reaction cycles.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
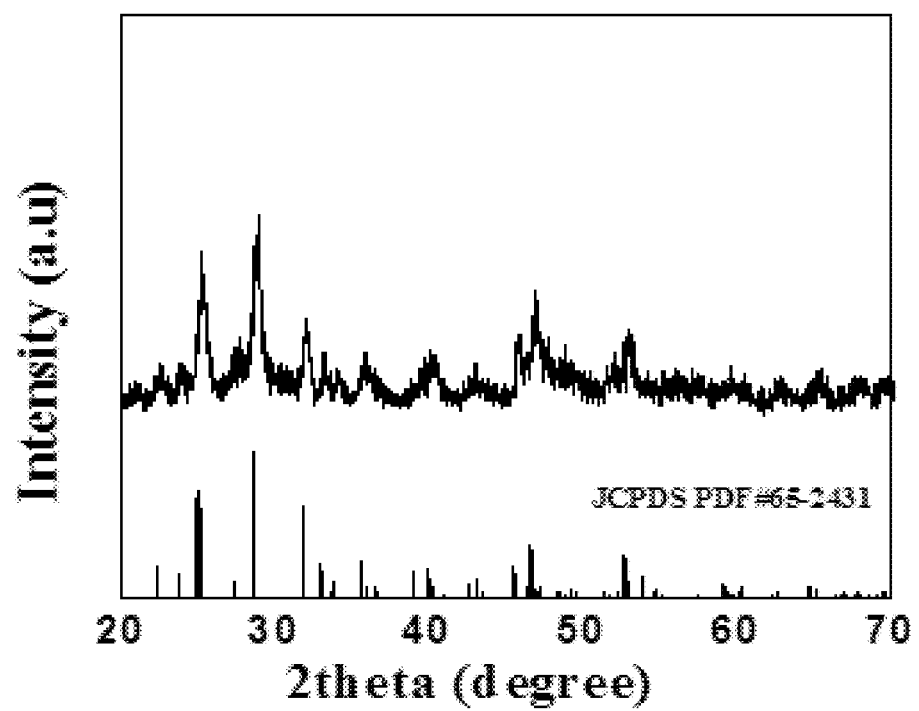
FIG. 1 shows the X-ray diffraction (XRD) patterns of a prepared $Bi_2S_3$—ZnS photocatalyst product and an orthorhombic $Bi_2S_3$ standard (JCPDS card no. 65-2431).

Embodiments of the present disclosure will now be described more fully hereinafter with reference to the accompanying drawings, in which some, but not all of the embodiments of the disclosure are shown.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a photocatalyst comprising i) bismuth (III) sulfide, and ii) zinc sulfide, wherein the photocatalyst has a chloroplast-like morphology with an average length of 500-3000 nm and an average width of 100-500 nm and an average ratio of length to width that is greater than 2.0.

As used herein, photocatalysis is the acceleration of a photoreaction in the presence of a catalyst, a photocatalyst. A photoreaction is a general term used to describe a chemical reaction caused by absorption of ultraviolet (wavelength from 100 to 400 nm), visible light (wavelength from 400-750 nm) or infrared radiation (wavelength from 750-2500 nm). In catalyzed photolysis, light is absorbed by an adsorbed substrate. In photogenerated catalysis, the photocatalytic activity (PCA) depends on the ability of the catalyst to create electron-hole pairs, which generate free radicals (e.g. hydroxyl radicals; .OH) able to undergo secondary reactions.

As used herein, bismuth (III) sulfide ($Bi_2S_3$) is a chemical compound of bismuth and sulfur. It occurs in nature as the mineral bismuthinite. Bismuth (III) sulfide can be prepared by reacting a bismuth (III) salt with hydrogen sulfide and bismuth (III) sulfide can also be prepared by the reaction of elemental bismuth and elemental sulfur in an evacuated silica tube at elevated temperatures (~500° C.) for an extended period of time (~96 hours). Bismuth (III) sulfide is isostructural with $Sb_2S_3$, stibnite, consisting of linked ribbons. Bismuth atoms are in two different environments, both of which have 7 coordinate bismuth atoms, 4 in a near planar rectangle and three more distant making an irregular 7-coordination group.

As used herein, zinc sulfide (ZnS) is an inorganic compound with the chemical formula of ZnS. This is the main form of zinc found in nature, where it primarily occurs as the mineral sphalerite. Although this mineral is usually black, due to various impurities, the pure material is white, and it is widely used as a pigment. In its dense synthetic form, zinc sulfide can be transparent, and it finds use in visible optics and infrared optics. Zinc sulfide is often produced from waste materials form other applications. Typical sources include, but are not limited to smelter, slag, and pickle liquors. It is also a byproduct of the synthesis of ammonia from methane where zinc oxide is used to scavenge hydrogen sulfide impurities in the natural gas. Zinc sulfide is easily produced in a laboratory by igniting a mixture of zinc and sulfur. Since zinc sulfide is insoluble in water, it can also be produced in a precipitation reaction. Solutions containing $Zn^{2+}$ salts readily form a precipitate ZnS in the presence of sulfide ions (e.g. from $H_2S$).

Zinc sulfide (ZnS) exists in two main crystalline forms, and this dualism is often a salient example of polymorphism. In each form, the coordination geometry at Zn and S is tetrahedral. The more stable cubic form is known as zinc blende or sphalerite, the more common polymorph of zinc sulfide. The hexagonal form is known as the mineral wurtzite, although it can also be produced synthetically. The transition from the sphalerite form to the wurtzite form occurs around 1020° C. A tetragonal form is also known as the rare mineral called polhemusite, with the formula (Zn, Hg)S. Fine ZnS powder is an efficient photocatalyst, which produces hydrogen gas from water upon illumination. Sulfur vacancies can be introduce in ZnS during its synthesis; this gradually turns the white-yellowish ZnS into a brown powder, and boost the photocatalytic activity through enhanced light absorption.

In a preferred embodiment, the photocatalyst has an atom ratio of bismuth to zinc in a range of 0.1-5.0, preferably 0.5-4.5, preferably 0.75-4.0, preferably 1.0-3.5, preferably 1.2-3.0, preferably 1.5-2.5, preferably 1.75-2.25. In a preferred embodiment, the photocatalyst has an atomic ratio of sulfur to bismuth in a range of 1.0-10.0, preferably 2.0-9.0, preferably 2.5-8.0, preferably 3.0-7.0, preferably 3.5-6.0, preferably 4.0-5.5. In a preferred embodiment, the photocatalyst has an atomic ratio of sulfur to zinc in a range of 2.0-12.0, preferably 3.0-10.0, preferably 4.0-8.0, preferably 5.0-7.0. In a preferred embodiment, the photocatalyst has a molar ratio of $Bi_2S_3$ to ZnS in a range of 1:10 to 10:1, preferably 1:8 to 8:1, preferably 1:6 to 6:1, preferably 1:4 to 4:1, preferably 1:2 to 2:1, preferably 1:1.5 to 1.5:1, preferably 1:1.1 to 1.1:1.

As used herein, a "heterostructure" refers to a combination of multiple heterojunctions. As used herein, a heterojunction refers to an interface that occurs between two layers and/or regions of dissimilar crystalline semiconductors (i.e. zinc sulfide and bismuth (III) sulfide). These semiconducting materials have unequal band gaps as opposed to a homojunction. It is often advantageous to engineer the electronic energy bands in many solid-state applications, such as photocatalysis. As used herein, band gap energy, band gap, and/or energy gap refers to an energy range in a solid where no electron states can exist. In graphs of the electronic band structure of solids, the band gap generally refers to the energy difference (in electron volts) between the top of the valence band and the bottom of the conduction band in insulators and/or semiconductors. It is generally the energy required to promote a valence electron bound to an atom to become a conduction electron, which is free to move within the crystal lattice and serve as a charge carrier to conduct electric current. It is closely related to the HOMO/LUMO gap in chemistry. In a preferred embodiment, the photocatalsyt of the present disclosure comprises a heterojunction, preferably several heterojunctions, and may be considered a heterostructure.

In certain embodiments, the $Bi_2S_3$ and ZnS may be homogeneously dispersed in the photocatalyst. In certain embodiments, the $Bi_2S_3$ and ZnS may form one or more layers of each other throughout the photocatalyst. In certain embodiments, the $Bi_2S_3$ may form a shell around a core of ZnS in the photocatalyst. In certain embodiments, the ZnS may form a shell around a core of $Bi_2S_3$ in the photocatalyst. In a preferred embodiment, the $Bi_2S_3$ is affixed to one or more surfaces of the ZnS in the photocatalyst. These materials may be affixed in any reasonable manner, such as physisorption or chemisorption and mixtures thereof via strong atomic bonds (e.g. ionic, metallic, and covalent bonds) and/or weak bonds such as van der Waals, or hydrogen bonds. In certain embodiments, the photocatalyst comprises $Bi_2S_3$ and/or ZnS incorporated into the lattice structure of the ZnS and/or $Bi_2S_3$. For example, the elemental $Bi_2S_3$ may be embedded between ZnS molecules to become integral with the lattice. Alternatively, the $Bi_2S_3$ may be embedded into the pores of the ZnS lattice and thus not integral to the ZnS lattice. In certain alternative embodiments, the $Bi_2S_3$ and/or ZnS is not incorporated into the lattice structure of ZnS and/or $Bi_2S_3$ and may be adsorbed on the surface (e.g. by van der Waals and/or electrostatic forces) of the ZnS and/or $Bi_2S_3$.

As used herein, a length of the photocatalyst having a chloroplast-like morphology refers to the longest linear distance measured from one point on the photocatalyst particle through the center of the photocatalyst particle to a point directly across from it. As used herein, a width of the photocatalyst having a chloroplast-like morphology refers to the longest linear distance measured from one point on the photocatalyst particle through the center of the photocatalyst particle directly across from it perpendicular to the length. As used herein, a thickness of the photocatalyst having a chloroplast-like morphology refers to the longest linear distance measure from one point on the photocatalyst particle through the center of the photocatalyst particle directly across from it perpendicular to both the length and the width.

In a preferred embodiment, the photocatalyst has a chloroplast-like morphology or is in the form of a chloroplast-like shape. As used herein a chloroplast-like shape refers to an oblong shape and is used synonymously with biconvex-shaped, football-shaped, lens shaped, and or sausage shaped. In a preferred embodiment, the photocatalyst has a chloroplast-like morphology with an average length of 500-3000 nm, preferably 800-2500 nm, preferably 1000-2250 nm, preferably 1250-2000 nm, preferably 1400-1800 nm, preferably 1500-1700 nm. In a preferred embodiment, the photocatalyst has a chloroplast-like morphology with an average width of 100-500 nm, preferably 125-450 nm, preferably 150-400 nm, preferably 175-350 nm, preferably 200-300 nm, preferably 225-275 nm. In a preferred embodiment, the photocatalyst has a chloroplast-like morphology with an average thickness of 10-250 nm, preferably 20-225 nm, preferably 40-200 nm, preferably 50-150 nm, preferably 60-140 nm, preferably 75-125 nm. In a preferred embodiment, the photocatalyst has a chloroplast-like morphology with an average length that is greater than the average width and an average width that is greater than the average thickness.

In a preferred embodiment, the photocatalyst has a chloroplast-like morphology with an average ratio of length to width that is greater than or equal to 2.0, preferably greater than or equal to 2.25, preferably greater than or equal to 2.5, preferably greater than or equal to 2.75, preferably greater than or equal to 3.0, preferably greater than or equal to 3.5, preferably greater than or equal to 4.0, preferably greater than or equal to 4.5, preferably greater than or equal to 5.0, preferably greater than or equal to 5.5, preferably greater than or equal to 6.0, preferably greater than or equal to 7.0, preferably greater than or equal to 8.0, preferably greater than or equal to 9.0, preferably greater than or equal to 10.0. In a preferred embodiment, the photocatalyst has a chloroplast-like morphology with an average ratio of length to width that is in a range of 2.0-8.0, preferably 3.0-7.0, preferably 4.0-6.0. In a preferred embodiment, the photocatalyst has a chloroplast-like morphology with an average ratio of width to thickness that is in a range of 1.1-5, preferably 1.5-4.0, preferably 2.0-3.0. In a preferred embodiment, the photocatalyst has a chloroplast-like morphology with an average ratio of length to thickness that is in a range of 3.0-10.0, preferably 4.0-9.0, preferably 5.0-8.0, preferably 5.5-7.0.

In a preferred embodiment, the photocatalyst and/or the chloroplast-like heterostructures of $Bi_2S_3$—ZnS of the present disclosure may be uniform. As used herein, the term "uniform" refers to no more than 10%, preferably no more than 5%, preferably no more than 4%, preferably no more than 3%, preferably no more than 2%, preferably no more than 1% of the distribution of the photocatalyst and/or the chloroplast-like heterostructures of $Bi_2S_3$—ZnS having a different shape. For example, the photocatalyst and/or the chloroplast-like heterostructures of $Bi_2S_3$—ZnS are uniform and have no more than 1% of the photocatalyst in a substantially flake or spherical shape. In certain embodiments, the photocatalyst and/or the chloroplast-like heterostructures of $Bi_2S_3$—ZnS may be non-uniform. As used herein, the term "non-uniform" refers to more than 10% of the distribution of the photocatalyst and/or the chloroplast-like heterostructures of $Bi_2S_3$—ZnS having a different shape. In certain embodiments, the photocatalyst may comprise additional shapes that provides the desired photocatalytic activity including, but not limited to, a flake, a sphere, a rod, a cylinder, a rectangle, a triangle, a pentagon, a hexagon, a prism, a disk, a platelet, a cube, a cuboid, and an urchin (e.g. a globular particle possessing a spiky uneven surface).

As used herein, "dispersity" is a measure of the heterogeneity of sizes of molecules or particles in a mixture. In probability theory or statistics, the coefficient of variation (CV), also known as relative standard deviation (RSD) is a standardized measure of dispersion of a probability distribution. It is expressed as a percentage and may be defined as the ratio of the standard deviation ($\sigma$) to the mean ($\mu$, or its absolute value $|\mu|$). The coefficient of variation or relative standard deviation is widely used to express precision and/or repeatability. It may show the extent of variability in relation to the mean of a population. In a preferred embodiment, the photocatalyst and/or the chloroplast-like heterostructures of $Bi_2S_3$—ZnS of the present disclosure have a narrow size dispersion, i.e. monodispersity. As used herein, "monodisperse", "monodispersed", and/or "monodispersity" refers to photocatalysts and/or the chloroplast-like heterostructures of $Bi_2S_3$—ZnS which have a CV or RSD of less than 30%, preferably less than 25%, preferably less than 20%, preferably less than 15%, preferably less than 12%, preferably less than 10%, preferably less than 8%, preferably less than 5%.

In a preferred embodiment, the photocatalyst and/or the chloroplast-like heterostructures of $Bi_2S_3$—ZnS are monodisperse with a coefficient of variation or relative standard deviation (ratio of the particle size standard deviation to the particle size mean) of less than 15%, preferably less than 12%, preferably less than 10%, preferably less than 9%, preferably less than 8%, preferably less than 7%, preferably less than 6%, preferably less than 5%, preferably less than 4%, preferably less than 2%. In a preferred embodiment, the photocatalyst and/or the chloroplast-like heterostructures of $Bi_2S_3$—ZnS and have a particle size distribution (referring to width, length, thickness, and/or ratio of length to width) in a range of 75% of the average particle size to 125% of the average particle size, preferably 80-120%, preferably 85-115%, preferably 86-114%, preferably 87-113%, preferably 88-112%, preferably 89-111%, preferably 90-110%, preferably 95% of the average particle size to 105% of the average particle size.

The Brunauer-Emmet-Teller (BET) theory aims to explain the physical adsorption of gas molecules on a solid surface and serves as the basis for an important analysis technique for the measurement of the specific surface area of a material. Specific surface area is a property of solids which is the total surface area of a material per unit of mass, solid or bulk volume, or cross sectional area. In a preferred embodiment, the photocatalyst and/or the chloroplast-like heterostructures of $Bi_2S_3$—ZnS of the present disclosure have a BET surface area in a range of 1-400 $m^2/g$, preferably 2-350 $m^2/g$, preferably 3-300 $m^2/g$, preferably 4-250 $m^2/g$, preferably 5-200 $m^2/g$, preferably 10-180 $m^2/g$, preferably 20-160 $m^2/g$, preferably 25-150 $m^2/g$, preferably 50-125 $m^2/g$.

As used herein, the quantum yield (QY) is a prime measure of photocatalyst effectiveness; QY (%)=(photochemical reaction rate)/(photon absorption rate)×100%. In a preferred embodiment, the photocatalyst of the present disclosure in any of its embodiments has a quantum yield of at least 10%, preferably at least 15%, preferably at least 20%, preferably at least 25%, preferably at least 30%, preferably at least 35%, preferably at least 40%, preferably at least 60%, preferably at least 80%.

In certain embodiments, the photocatalyst of the present disclosure may further comprise one or more further semiconductor materials, preferably one or more further semiconductor materials that fulfill the band requirements for photocatalytic hydrogen production. Exemplary suitable further semiconductor materials include, but are not limited to, at least one metal oxide of a d° group metal selected from the group consisting of $Ti^{4+}$, $Zr^{4+}$, $Nb^{5+}$, $Ta^{5+}$, and $W^{6+}$ or at least one metal oxide of a $d^{10}$ group metal selected from the group consisting of $Ga^{3+}$, $In^{3+}$, $Ge^{4+}$, $Sn^{4+}$, and $Sb^{5+}$ such as, for example, $TiO_2$, $WO_3$, $SrTiO_3$, $K_2La_2Ti_3O_{10}$, $ZrO_2$, $K_4Nb_6O_{17}$, $Sr_2Nb_2O_7$, $ATaO_3$ (A=Li, Na, K), $BaTa_2O_6$, $AMWO_6$ (A=Rb, Cs; M=Nb, Ta), $ZnGa_2O_4$, $AInO_2$ (A=Li, Na), $Zn_2GeO_4$, $Sr_2SnO_4$, and $NaSbO_7$.

In certain embodiments, the photocatalyst of the present disclosure may further comprise one or more additives, preferably dopants and/or co-catalysts added to optimize their performance or designed to increase $H_2$ and/or $O_2$ production. Exemplary suitable chemical additives include, but are not limited to, electron donors (e.g. organic hydrocarbons or inorganic ions such as $S^{2-}/SO_3^{2-}$, $Ce^{4+}/Ce^{3+}$, and $IO_3^-/I^-$) and carbonate salts (i.e. $HCO_3^-$, $CO_3^-$, and $C_2O_6^{2-}$) to suppress the reverse reaction. Further, the photocatalyst may be modified, preferably to enhance $H_2$ and $O_2$ production. Exemplary suitable modifications include, but are not limited to, noble metal loading (e.g. Pt, Au, Pd, Rh, Ni, Cu, and Ag), ion doping including metal ion doping (e.g. Fe, Mo, Ru, Os, Re, V, Rh, Cr, Mn, and Co) and anion doping (e.g. N, F, C, N, P, O and S), sensitization including dye sensitization (e.g. thiazines, hiazines, phenazines, xanthenes, acridines, triphenyl methane derivatives), and one or more additional composite semiconductors, and metal ion implantation (e.g. V-ions, Mn-ions, Ni-ions, Ar-ions, Mg-ions, Cr-ions, Ti-ions, and Fe-ions).

In certain embodiments, the dimensions or ranges of the photocatalyst and/or the chloroplast-like heterostructures of $Bi_2S_3$—ZnS of the present disclosure in any of their embodiments may vary from these dimensions or ranges and the photocatalyst and/or the chloroplast-like heterostructures of $Bi_2S_3$—ZnS can still function as intended.

According to a second aspect, the present disclosure relates to a method of forming the photocatalyst of the present disclosure in any of its embodiments, the method comprising i) mixing a bismuth trihalide, a zinc salt, and a thiourea organosulfur compound in a solvent in the presence of polyvinyl pyrrolidone thereby forming a reaction slurry, and ii) heating the reaction slurry in an autoclave at a temperature of 100-300° C. for a time period of 1-30 hours thereby forming the photocatalyst, wherein the average ratio of length to width of the photocatalyst increases as an amount of polyvinyl pyrrolidone present in the reaction slurry increases. The method of the present disclosure in any of its embodiments may be conducted as a batch or continuous process. As used herein, "continuous" refers to a method used to produce materials without interruption or where the reactants are flowed and/or are in motion during a chemical reaction.

As used herein, the term "solvent" refers to an includes, but is not limited to, water (e.g. tap water, distilled water, deionized water, deionized distilled water), organic solvents, such as ethers (e.g. diethyl ether, tetrahydrofuran, 1,4-dioxane, tetrahydropyran, t-butyl methyl ether, cyclopentyl methyl ether, di-iso-propyl ether), glycol ethers (e.g. 1,2-dimethoxyethane, diglymer, triglyme), alcohols (e.g. methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, α,α,α-trifluoromethylbenzene, fluorobenzened), chlorinated solvents (e.g. chlorobenzene, dichloromethane, 1,2-dichloroethane, 1,1-dichloroethane, chloroform), ester solvents (e.g. ethyl acetate, propyl acetate), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, and mixtures thereof. As used herein solvent may refer to non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide) and polar protic solvents (e.g. acetic acid, n-butanol, isopropanol, n-propanol, ethanol, methanol, formic acid, water) and mixtures thereof.

In a preferred embodiment, the solvent is a polar protic solvent, preferably an ether, preferably a glycol ether, most preferably ethylene glycol. In a preferred embodiment, the solvent has a boiling point of 100-300° C., preferably 120-280° C., preferably 140-260° C., preferably 160-240° C., preferably 180-220° C. and density of 0.8-1.4 $g/cm^3$, preferably 0.9-1.2 $g/cm^3$, preferably 1.0-1.15 $g/cm^3$ and a molar mass of 20-150 g/mol, preferably 40-100 g/mol, preferably 50-75 g/mol.

As used herein, a salt refers to an ionic compound resulting from the neutralization reaction of an acid and a base. Salts are composed of related numbers of cation (positively charged ions) and anions (negatively charged ions) such that the product is electrically neutral (without a net charge). These component ions may be inorganic (e.g. chloride, $Cl^-$) or organic (e.g. acetate, $CH_3CO_2^-$) and may be monoatomic (e.g. fluoride, $F^-$) or polyatomic (e.g. sulfate, $SO_4^{2-}$. Exemplary conventional salts include, but are not limited to, those derived from inorganic acids including, but not limited to, hydrochloric, hydrobromic, sulfuric, sulfamic, phosphoric, and nitric; and those derived from organic acids including, but not limited to, acetic, propionic, succinic, glycolic, stearic, lactic, malic, tartaric, citric, ascorbic, pamoic, maleic, hydroxymaleic, phenylacetic, glutamic, benzoic, salicyclic, sulfanilic, 2-acetoxybenzoic, fumaric, toluenesulfonic, methanesulfonic, ethane disulfonic, oxalic, isethionic, and mixtures and hydrates thereof and the like.

As used herein, a solvate refers to a physical association of a compound with one or more solvent molecules, whether organic or inorganic, preferably water in a hydrate. This physical association may include hydrogen bonding. In certain instances the solvent molecule(s) may be incorporated in the crystal lattice of the crystalline solid. The solvent molecule(s) may be present in a regular arrangement and/or a non-ordered arrangement. The solvate may comprise either a stoichiometric or nonstoichiometric amount of the solvent molecule(s). In certain embodiments, the zinc salt may be a hydrate. As used herein, a hydrate is a substance that contains water or its constituent elements. The chemical state of the water may vary between different classes of hydrates. Many organic molecules, as well as inorganic molecules, form crystals that incorporate water into the crystalline structure without chemical alteration of the molecule. A hydrated salt is generally a crystalline salt molecule that is loosely attached to a certain number of water molecules. In a hydrated salt, the water molecules maybe incorporated into the crystalline structure of the salt. Generally, in inorganic chemistry, hydrates are inorganic salts containing water molecules combined in a definite ratio as an integral part of the crystal that are either bound to a metal center or that have crystallized with the metal complex. The notation of a hydrated compound (n-H2O) where n is a number of water molecules per formula unit of the salt is commonly used to show that a salt is hydrated. The n is usually a low integer, though it is possible for fractional values to occur.

Exemplary suitable zinc salts or hydrates include, but are not limited to, zinc nitrate ($Zn(NO_3)_2$), zinc chlorate ($Zn(ClO_3)_2$), zinc sulfate ($ZnSO_4$), zinc phosphate ($Zn_3(PO_4)_2$), zinc molybdate ($ZnMoO_4$), zinc chromate ($ZnCrO_4$), zinc arsenite ($Zn(AsO_2)_2$), zinc arsenate octahydrate ($Zn(AsO_4)$ $.8H_2O$), zinc acetate ($Zn(O_2CCH_3)_2$), zinc acetate dihydrate ($Zn(CH_3COO)_2.2H_2O$), zinc bromide, zinc bromide dihydrate, zinc chloride, zinc citrate dihydrate, zinc cyanide, zinc fluoride, zinc hexafluorosilicate, zinc iodide, zinc methacrylate, zinc nitrate hydrate, zinc nitrate hexahydrate, zinc oxalate hydrate, zinc perchlorate hexahydrate, zinc selenite, zinc sulfate heptahydrate, zinc tetrafluoroborate hydrate, zinc p-toluenesulfonate hydrate, zinc stearate, zinc acrylate, zinc trifluoromethanesulfonate, zinc undecylenate, zinc diethyldithiocarbamate, zinc trifluoroacetate hydrate, orotic acid zinc salt dihydrate, zinc acexamate, glycine zinc salt monohydrate, zinc dimethyldithiocarbamate, zinc difluoromethanesulfinate, zinc trifluoromethanesulfinate, and the like.

In a preferred embodiment, the zinc salt is an organic zinc salt, preferably a hydrate, most preferably the zinc salt is zinc acetate dihydrate, $Zn(CH_3COO)_2.2H_2O$. Zinc acetate is a salt with the formula $Zn(O_2CCH_3)_2$, which commonly occurs as the dihydrate $Zn(O_2CCH_3)_2(H_2O)_2$. Both the hydrate and the anhydrous forms are colorless solids that are used in chemical synthesis. In anhydrous zinc acetate the zinc is coordinated to four oxygen atoms to give a tetrahedral environment, these tetrahedral polyhedral are then interconnected by acetate ligands to give a range of polymeric structures. In zinc acetate dihydrate the zinc is octahedral, wherein both acetate groups are bidentate. In certain embodiments, an amount of the zinc salt may be in a range of 0.01-1000 mmol, preferably 0.1-100 mmol, preferably 0.5-50 mmol, preferably 0.75-25 mmol, preferably 1.0-10 mmol. In a preferred embodiment, the concentration of the zinc salt in the reaction slurry is in a range of 0.01-0.1 M, preferably 0.02-0.08 M, preferably 0.04-0.06 M, or about 0.05 M.

Exemplary suitable bismuth trihalides include, but are not limited to, bismuth (III) bromide, bismuth (III) chloride, bismuth (III) fluoride, bismuth (III) iodide, and the like. It is equally envisioned that the method of the present disclosure may be adapted to incorporate additional bismuth (III) salts and/or hydrates including, but not limited to, bismuth (III) nitrate pentahydrate, bismuth (III) oxychloride, and the like. In a preferred embodiment, the bismuth trihalide is bismuth (III) chloride, $BiCl_3$. Bismuth chloride, bismuth trichloride, or butter of bismuth is an inorganic compound with the chemical formula $BiCl_3$, it is a common source of the $Bi^{3+}$ ion. In the crystal, and the gas phase, the species adopts a pyramidal structure. In certain embodiments, an amount of the bismuth trihalide may be in a range of 0.01-1000 mmol, preferably 0.05-100 mmol, preferably 0.1-50 mmol, preferably 0.25-25 mmol, preferably 0.5-10 mmol. In a preferred embodiment, the concentration of the bismuth trihalide in the reaction slurry is in a range of 0.005-0.1 M, preferably 0.01-0.08 M, preferably 0.02-0.06 M, preferably 0.02-0.04 M, or about 0.025 M.

As used herein, a thiourea organosulfur compound refers to a broad class of compounds with the general structure $(R^1R^2N)(R^3R^4N)C=S$ wherein $R^1$, $R^2$, $R^3$, and $R^4$ are each independently —H, an optionally substituted alkyl, an optionally substituted cycloalkyl, an optionally substituted cycloalkylalkyl, an optionally substituted arylalkyl, an optionally substituted alkenyl, an optionally substituted heteroaryl, an optionally substituted aryl, an optionally substituted heterocyclyl, an optionally substituted aryl olefin, or an optionally substituted vinyl. As used herein, the term "substituted" refers to at least one hydrogen atom that is replaced with a non-hydrogen group, provided that normal valencies are maintained and that the substitution results in a stable compound.

Exemplary suitable thiourea organosulfur compounds include, but are not limited to, thiourea ($NH_2CSNH_2$), 1,3-diisopropyl-2-thiourea, 1,3-di-p-tolyl-2-thiourea, 1-(2-m ethoxyphenyl)-2-thiourea, propylene thiourea, 1-(4-nitrophenyl)-2-thiourea, 1-(3-nitrophenyl)-2-thiourea, N-Boc-thiourea, (2,3-difluorophenyl)thiourea, (3,5-dimethylphenyl)thiourea, (4-cyanophenyl)thiourea, (4-fluorophenyl)thiourea, 1-(3-carboxyphenyl)-2-thiourea, (2,5-difluorophenyl)thiourea, (3-fluorophenyl)thiourea, (2,4-difluorophenyl)thiourea, (2,6-difluorophenyl)thiourea, (2-fluorophenyl)thiourea, (4-acetylphenyl)thiourea, 1-(2,3-dichlorophenyl)-2-thiourea, 1-(2-bromophenyl)-2-thiourea, 1-(2-ethylphenyl)-2-thiourea, 1-(2-furfuryl)-2-thiourea, 1-(2-tetrahydrofurfuryl)-2-thiourea, 1-(3,4-methylenedioxyphenyl)-2-thiourea, 1-(3-acetylphenyl)-2-thiourea, 1-(3-bromophenyl)-2-thiourea, 1-(3-cyanophenyl)-2-thiourea, 1-(3-ethoxycarbonylphenyl)-2-thiourea, 1-(3-methoxybenzyl)-2-thiourea, 1-(3-phenylpropyl)-2-thiourea, 1-(4-chlorophenyl)-2-thiourea, 1-(4-ethoxycarbonylphenyl)-2-thiourea, N-(2,4,6-trichlorophenyl)thiourea, N-(3,5-dichlorophenyl)thiourea, N-(4-phenoxyphenyl)thiourea, N-(4-pyridyl)thiourea, N-(6-quinolinyl)thiourea, N-(8-quinolinyl)thiourea, N,N'-di-Boc-thiourea, [3-(trifluoromethyl)phenyl]thiourea, 1-cyclohexyl-3-(2-morpholinoethyl)-2-thiourea, [4-(trifluoromethyl)phenyl]thiourea, 1,3-bis[3,5-bis(trifluoromethyl)phenyl]thiourea, 1-[4-(dimethylamino)phenyl]-2-thiourea, 1-(1,3-diphenyl-1H-pyrazol-5-yl)thiourea, 1-(3-chloro-4-fluorophenyl)thiourea, 1-(4-(4-bromophenoxy)phenyl)thiourea, 1-(4-(4-chlorophenoxy)phenyl)thiourea, 1-(4-(4-fluorophenoxy)phenyl)thiourea, 1-(4-(4-methoxyphenoxy)phenyl)thiourea, 1-(4-(p-tolyloxy)phenyl)thiourea, 1-(4-chlorophenyl-3-[(2-phenylacetyl)amino]thiourea, 1-(5-chloro-2-(trifluoromethyl)phenyl)thiourea, 1-benzyl-3-(2,6-di methylphenyl)thiourea, 1-benzyl-3-(2-ethoxyphenyl)thiourea, 1-benzyl-3-(4-methoxyphenyl)thiourea, 1-benzyl-3-(naphthalen-1-yl)thiourea, 1-ethyl-3-(2-m ethoxyphenyl)thiourea, 1-ethyl-3-(4-fluorophenyl)thiourea, [4-bromo-2-(trifluoromethyl)phenyl]thiourea, N-[2-(trifluoromethyl)phenyl]thiourea, N-(1,3-dimethyl-1H-pyrazol-5-yl)thiourea, N-(1H-1,3-benzimidazol-5-yl)thiourea, N-(1H-indazol-5-yl)thiourea, N-(1H-indazol-6-yl)thiourea, N-(1H-indazol-7-yl)thiourea, N-phenylthiourea, N-(1-naphthyl)thiourea, N-allylthiourea, N,N'-diphenylthiourea, 1,1,3-triphenyl-2-thiourea, 1,3-di-tert-butyl-2-thiourea, 1,3-diallyl-2-thiourea, 1,3-dibenzyl-2-thiourea, 1,3-dicyclohexyl-2-thiourea, 1,3-difurfuryl-2-thiourea, 1,3-diheptyl-2-thiourea, 1,3-dihexadecyl-2-thiourea, 1,3-dihexyl-2-thiourea, 1,3-dioctyl-2-thiourea, 1,3-dipropyl-2-thiourea, 1-(2,4,6-tribromophenyl)-2-thiourea, 1-(2,4-dichlorophenyl)-2-thiourea, 1-(2,6-xylyl)-2-thiourea, 1-(3,4-dimethoxyphenyl)-2-thiourea, 1-(3-chlorophenyl)-2-thiourea, 1-(3-methoxypropyl)-2-thiourea, 1-benzyl-2-thiourea, 1-butyl-2-thiourea, 1-dodecanoyl-2-thiourea, N-(2,4-dimethylphenyl)thiourea, N-(2,5-dichlorophenyl)thiourea, N-(2,6-dichlorophenyl)thiourea, N-(2-phenyl ethyl)thiourea, N-(3,4-dichlorophenyl)thiourea, N-(3,4-dimethylphenyl)thiourea, N-(3-methoxyphenyl)thiourea, N-(4-bromophenyl)thiourea, N-(4-chlorophenyl)thiourea, N-(4-ethoxyphenyl)thiourea, N-(4-ethylphenyl)thiourea, N-(4-methoxyphenyl)thiourea, N-(4-methylphenyl)thiourea, N-(tert-butyl)thiourea, (2,3-dimethyl-phenyl)thiourea, (2,4,6-trimethyl-phenyl)thiourea, (3,4,5-trimethoxy-phenyl)thiourea, (4-ethoxy-phenyl)thiourea, (phenyl-phenyliminomethyl)thiourea, and the like.

In a preferred embodiment, the thiourea organosulfur compound is thiourea of formula $SC(NH_2)_2$, wherein $R^1=R^2=R^3=R^4=-H$. Thiourea is an organosulfur compound that is structurally similar to urea, except that the oxygen atom is replaced by a sulfur atom, but the properties of urea and thiourea differ. Thiourea is a reagent in organic synthesis. Thiourea is commonly employed as a source of sulfide, often with reactions proceeding via the intermediacy of isothiuronium salts with the reaction capitalizing on the high nucleophilicity of the sulfur center and easy hydrolysis of the intermediate isothiouronium salt. Thiourea is a planar molecule. The C=S bond distance is approximately 1.60±0.1 Å for thiourea, as well as many of its derivatives. The material has the unusual property of changing to ammonium thiocyanate upon heating above ~130° C. Upon cooling, the ammounium salt converts back to thiourea. Thiourea occurs in two tautomeric forms (thione and thiol). In aqueous solutions the thione form predominates. The thiol form, which is also known as an isothiourea, can be encountered in substituted compounds, such as isothiouronium salts. In certain embodiments, an amount of the thiourea organosulfur compound may be in a range of 0.01-1000 mmol, preferably 0.1-100 mmol, preferably 0.5-50 mmol, preferably 1.0-25 mmol, preferably 2.0-10 mmol. In a preferred embodiment, the concentration of the thiourea organosulfur compound in the reaction slurry is in a range of 0.01-1.0 M, preferably 0.05-0.75 M, preferably 0.1-0.5 M, preferably 0.15-0.25 M.

In a preferred embodiment, the molar ratio of the thiourea organosulfur compound to the bismuth trihalide is in a range of 2-10, preferably 3-9, preferably 4-8, preferably 5-7, or about 6. In a preferred embodiment, the molar ratio of the thiourea organosulfur compound to the zinc salt is in a range of 0.5-6, preferably 1-5, preferably 2-4, or about 3. In a preferred embodiment, the molar ratio of the zinc salt to the bismuth trihalide is in a range of 1.25-5, preferably 1.5-4, preferably 1.75-3, or about 2.

Figure 12:
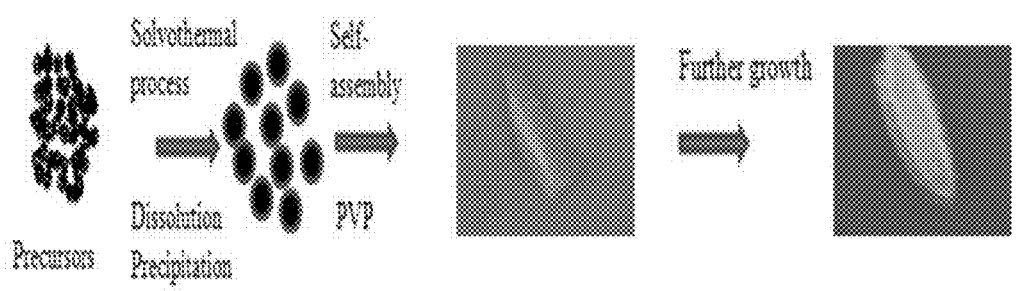
FIG. 12 is a schematic stepwise illustration of a formation mechanism for a prepared $Bi_2S_3$—ZnS photocatalyst product having a chloroplast-like structure.

In preferred embodiments, the average ratio of length to width of the photocatalyst (i.e. the chloroplast-like morphology) increases as an amount of polyvinyl pyrrolidone present in the reaction slurry increases. In this manner, it is envisaged that the chloroplast-like morphology of the photocatalyst produced by the method described herein in any of its embodiments may be controlled by the amount of polyvinyl pyrrolidone present in the reaction slurry. Without wishing to be bound by theory, it is envisioned that polyvinyl pyrrolidone may act as a surfactant and aid the formation of defined photocatalyst morphologies having chloroplast-like structures. Without wishing to be bound by theory, it is envisioned that initially nuclei of the photocatalyst are formed in the reaction slurry or solution and these nuclei may self-assemble to form some flakes. The selective adsorption of surfactant (i.e. polyvinyl pyrrolidone) on the surface of photocatalyst products may be responsible for the formation of the flakes and thus promoting a tune or shape-tuning self-assembly. Additionally, the self-assembly of nanocrystals may be determined by van der Waals forces and hydrogen bonding existing among the certain organic molecules (e.g. surfactants such as polyvinyl pyrrolidone) on the surface of nanomaterials. It is envisaged that as the reaction proceeds further, the presence of some un-assembled nuclei may further assemble with these flakes to form more elongated (i.e. increased average ratio of length to width) shapes of these shapes. Further, the continued growth of these elongated shapes results in the formation of the photocatalyst of the present disclosure in any of its embodiments which has a chloroplast-like structure or morphology. The formation of these chloroplast-like structures may be due to relatively higher free energies of those crystal faces along the preferred direction. Surfactants, specifically polyvinyl pyrrolidone may have multiple roles in controlling the formation of chloroplast like photocatalyst structures including, but not limited to, i) prevent the aggregation of $Bi_2S_3$—ZnS during an initial stage of the formation of the nanoflakes, ii) selectively adsorb onto the facet of crystals, and iii) promote self-assembly (FIG. 12).

As used herein, polyvinyl pyrrolidone (PVP), also commonly known as polyvidone or povidone refers to a water soluble polymer obtainable from the monomer N-vinylpyrrolidone. In certain embodiments polyvinyl pyrrolidone may refer to cross-linked derivatives, a highly cross-linked modification of polyvinyl pyrrolidone (PVP) is known as polyvinylpolypyrrolidone (PVPP, crospovidone, crospolividone or E1202). PVP binds to polar molecules exceptionally well, owing to its polarity. PVP is soluble in water and other polar solvents including alcohols (e.g. methanol and ethanol) as well as more exotic solvents (e.g. deep eutectic solvent and urea). When dry, PVP is a light flaky hygroscopic powder, readily able to absorb up to ~40% of its weight in atmospheric water. In solution, it has excellent wetting properties and readily forms films.

PVP polymers are available in several viscosity grades, ranging from low to high molecular weight and may be supplied in various viscosity grades as a powder and/or aqueous solution. Exemplary suitable commercial grades of polyvinyl pyrrolidone include, but are not limited to, PVP K-12, PVP K-15, PVP K-30, PVP K-60, PVP K-90, and PVP K-120. The K-value assigned to various grades of PVP polymer may represent a function of the average molecular weight, the degree of polymerization and the intrinsic viscosity. The K-values may be derived from viscosity measurements and calculated according to Fikentscher's formula. In a preferred embodiment, the polyvinyl pyrrolidone has a K-value in a range of 8-140, preferably 10-100, preferably 15-80, preferably 20-60, preferably 25-40.

Some of the techniques for measuring the molecular weight of various PVP polymer products are based on measuring sedimentation, light scattering, osmometry, NMR spectroscopy, ebulliometry, and size exclusion chromatography for determining absolute molecular weight distribution. By the use of these methods, any one of three molecular weight parameters can be measured, namely the number average (Mn), viscosity average (Mv), and weight average (Mw). As used herein the mass average molar mass or weight average molar mass (Mw) describes the molar mass of a polymer with some properties dependent on molecular size, so a larger molecule will have a larger contribution than a smaller molecule. In a preferred embodiment, the polyvinyl pyrrolidone has a weight average molar mass (Mw) in a range of 3,000-3,000,000 g/mol, preferably 6,000-2,000,000 g/mol, preferably 10,000-1,000,000 g/mol, preferably 15,000-900,000 g/mol, preferably 20,000-500,000 g/mol, preferably 30,000-300,000 g/mol, preferably 30,000-100,000 g/mol, preferably 40,000-80,000 g/mol.

As used herein, the polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and can be affected by a variety of reaction conditions such as reactant ratios, how close the polymerization went to completion, etc. In one embodiment, the polyvinyl pyrrolidone of the present disclosure has a PDI of up to 6, preferably up to 5, preferably up to 3, preferably up to 2.5, preferably up to 2, preferably up to 1.5, preferably up to 1.25. As used herein, he degree of polymerization (DP) is defined as the number of monomeric units in a macromolecule or polymer. In one embodiment, the polyvinyl pyrollidone of the present disclosure has a degree of polymerization of 50-5000, preferably 100-2500, preferably 100-1500, preferably 100-750, preferably 100-300.

As used herein, the glass-liquid transition or glass transition is the reversible transition in amorphous materials (or in amorphous regions within semicrystalline materials) from a hard and relatively brittle "glassy" state into a viscous or rubbery state as the temperature is increased. The glass transition temperature ($T_g$) of a material characterizes the range of temperatures over which this glass transition occurs. It is always lower than the melting temperature ($T_m$) of the crystalline state of the material if one exists. In polymers the glass transition temperature ($T_g$) is often expressed as the temperature at which the Gibbs free energy is such that the activation energy for the cooperative movement of 50 or so elements of the polymer is exceeded. In a preferred embodiment, the polyvinyl pyrrolidone has a glass transition temperature ($T_g$) in a range of 90-200° C., preferably 100-180° C., preferably 120-170° C., preferably 140-160° C. In a preferred embodiment, the polyvinyl pyrrolidone has a melting temperature (Tm) in a range of 100-220° C., preferably 120-210° C., preferably 140-200° C., preferably 150-180° C.

In a preferred embodiment, 1-50 g of polyvinyl pyrrolidone is present per liter of the reaction slurry, preferably 5-45 g/L, preferably 10-40 g/L, preferably 15-35 g/L, preferably 20-30 g/L, preferably 22-28 g/L, preferably 24-26 g/L, or about 25 g of polyvinyl pyrrolidone is present per liter of the reaction slurry. In certain embodiments, an amount of the polyvinyl pyrrolidone is in a range of 1-40 mol % based on the number of moles of the bismuth trihalide present in the reaction slurry, preferably 5-30 mol %, preferably 5-25 mol %, preferably 5-20 mol5, preferably 10-20 mol %, preferably 10-15 mol % based on the number of moles of the bismuth trihalide present in the reaction slurry.

In a preferred embodiment, 5-25 g of polyvinyl pyrrolidone is present per litter of the reaction slurry and the average ratio of length to width of the photocatalyst is in a range of 2.5-5.0. In certain embodiments, 5-10 g of polyvinyl pyrrolidone is present per litter of the reaction slurry and the average ratio of length to width of the photocatalyst is in a range of 2.5-3.0. In certain embodiments, 10-15 g of polyvinyl pyrrolidone is present per litter of the reaction slurry and the average ratio of length to width of the photocatalyst is in a range of 3.0-3.5. In certain embodiments, 15-20 g of polyvinyl pyrrolidone is present per litter of the reaction slurry and the average ratio of length to width of the photocatalyst is in a range of 3.5-4.0. In certain embodiments, 20-22 g of polyvinyl pyrrolidone is present per litter of the reaction slurry and the average ratio of length to width of the photocatalyst is in a range of 4.0-4.5. In certain embodiments, 22-25 g of polyvinyl pyrrolidone is present per litter of the reaction slurry and the average ratio of length to width of the photocatalyst is in a range of 4.5-5.0. In a preferred embodiment, 5-25 g of polyvinyl pyrrolidone is present per litter of the reaction slurry, preferably 8-22 g, preferably 10-20 g, preferably 12-18 g, preferably 14-16 g of polyvinyl pyrrolidone is present per liter of the reaction slurry and the average ratio of length to width of the photocatalyst is in a range of 2.5-5.0, preferably 3.0-4.75, preferably 3.25-4.5, preferably 3.5-4.25, preferably 3.5-4.0.

It is equally envisaged that the method of the present disclosure in any of its embodiments may be adapted to incorporate one or more additional surfactants in addition to, or in lieu of, the polyvinyl pyrrolidione. It is equally envisaged that one or more additional surfactants may act similarly to polyvinyl pyrrolidone and control the chloroplast-like morphology of the photocatalyst of the present disclosure in any of its embodiments. Exemplary suitable additional surfactants include, but are not limited to, polymeric surfactants or surfactant polymers such as, for example, block type polymers with well-defined and separated hydrophilic and lipophilic parts (e.g. a copolymer of ethylene-oxide and propylene oxide with 1-5 blocks, preferably 2-3 blocks), graft type polymers including but not limited to, polyelectrolytes (e.g. caboxymethyl cellulose, polyacrylic acid and derivatives) and prepared lipophilic polymers with functional groups where a hydrophilic group can be attached such as, for example, the copolymer of maleic acid and styrene where the anhydride group readily reacts with any alcohol, amine, acid, and the like to produce a hydrophilic group such as, for example, polycarbonates obtainable by polycondensation of an alkyl phenol with salicylic acid and formaldehyde, sulfonated (on an aromatic ring) derivatives, sulfated (on an —OH group) derivatives, alkylphenol-formol resins turned hydrophilic by adding polyethylene oxide or sulfate or ether-sulfate groups, similar substances prepared with cationic characteristics such as polyvinyl pyridines and pyrolidones, and association polymers (e.g. lauryl-stearyl α-lecithin).

Exemplary suitable additional surfactants include, but are not limited to, i) anionic surfactants such as, for example soaps and other carboxylates, sulfonation and sulfatation products, sulfates (e.g. alkyl sulfates, alkyl-ester-sulfate, alkyl ether sulfates, alkyl-ethoxy-ester-sulfate, sulfated alkanolamides, glyceride sulfates), sulfonates (e.g. dodecyl benzene sulfonate and synthetic detergents, short tail alkyl-benzene sulfonates and hydrotropes, alpha olefin sulfonates, lignosulfonates, sulfo-carboxylic compounds), organo phosphored surfactants (e.g. phosphorous acid phosphites, phosphoric acid phosphates, phosphonic acid phosphonates), and sacrosides or alcyl amino acids, ii) nonionic surfactants such as for example, ethoxylated alcohols, ethoxylated linear alcohols, ethoxylated alkyl phenols, ethoxylated thiols, fatty acid esters, acid ethoxylated fatty acids, glycerol esters, esters of hexitols and cyclic anhydrohexitols (e.g. 1-5 sorbitan, 1-4,3-6 isosorbitan, amine and amide derivatives (e.g. nitrogentated nonionic surfactants di-acyl ethoxy urea, ethoxylated imide, fatty amine oxide), alkylpolyglucosides, ethyleneoxid/propyleneoxide copolymers, polyalcohols and ethoxylated polyalcohols, thiols (mercaptans) and derivatives, iii) cationic surfactants such as, for example, linear alkyl-amines and alkyl ammoniums, linear diamines containing methylene groups, aromatic or saturated heterocycles including one or more nitrogen atoms, morpholine compounds, nitrogenated surfactants with a second hydrophile (e.g. amide-, ester- and ether-amines, oxy- and ethoxy-amines, alkanol amides, amino acids), iv) amphoteric surfactants (e.g. amino propionic acids, imido propionic acids, quaternized compounds like alkyl betaine/alkyl sulfobetaine) v) silicon surfactants and vi) fluorinated surfactants.

In a preferred embodiment, the reaction slurry may be heated at a temperature of 100-300° C., preferably 120-280° C., preferably 140-260° C., preferably 160-240° C., preferably 175-225° C., preferably 180-220° C. In a preferred embodiment, the reaction slurry may be heated at a temperature of 180-220° C., preferably 182-218° C., preferably 184-216° C., preferably 186-214° C., preferably 188-212° C., preferably 190-210° C., preferably 192-208° C., preferably 194-206° C., preferably 196-204° C., preferably 198-202° C., or about 200° C. In a preferred embodiment, the reaction slurry may be heated for a time period of 1-30 hours, preferably 4-29 hours, preferably 8-28 hours, preferably 10-27 hours, preferably 12-26 hours, preferably 16-24 hours. In a preferred embodiment, the reaction slurry may be heated for a time period of 16-24 hours, preferably 17-23 hours, preferably 18-22 hours, preferably 19-21 hours, preferably 19.5-20.5 hours, or about 20 hours. In certain embodiments, the reaction slurry may be stirred (e.g. at a speed of 50-1000 rpm, 50-900 rpm, 50-700 rpm, 50-500 rpm, 100-500 rpm, or 200-400 rpm) or in certain embodiments the reaction slurry may be left to stand or not stirred during the heating.

After heating, preferably in an autoclave, preferably a Teflon lined autoclave, the autoclave may be left to cool to a temperature in a range of 10-40° C., preferably 10-30° C., preferably 20-30° C. The photocatalyst may be collected/washed/dried by methods commonly known to those of ordinary skill in the art. For example, the photocatalyst may be collected by filtering and/or centrifugation, washed one or more times with solvents such as water and ethanol and dried in an oven or ambient conditions at a temperature in a range of 40-100° C., preferably 45-90° C., preferably 50-80° C., preferably 55-70° C. for a time period of 1-48 hours, preferably 6-36 hours, preferably 10-30 hours, preferably 20-28 hours, preferably 22-26 hours at a pressure in a range of 0.00001-10 bar, preferably 0.0001-1 bar, preferably 0.001-0.5 bar, preferably 0.001-0.1 bar.

According to a third aspect, the present disclosure relates to a method of forming hydrogen gas, the method comprising i) contacting an aqueous solution with the photocatalyst of the present disclosure in any of its embodiments, thereby forming a reaction mixture and ii) irradiating the reaction mixture with a light source having a wavelength of 300-800 nm, preferably 385-740 nm, preferably 400-700 nm thereby forming hydrogen gas.

The method of the present disclosure in any of its embodiments may be conducted as a batch or continuous process. As used herein, "continuous" refers to a method used to produce materials without interruption or where the reactants are flowed and/or are in motion during a chemical reaction. The reaction mixture may be shaken/stirred throughout the duration of the irradiating or reaction by employing a rotary shaker, a magnetic stirrer, or an overhead stirrer. In certain embodiments, the reaction mixture may be left to stand (i.e. not stirred) during the irradiating or reaction. In certain embodiments, the reaction mixture may be sonicated during the irradiating or reaction.

As used herein, photocatalytic water splitting refers to an artificial photosynthesis process carried out with one or more photocatalysts in a photochemical, photolytic, and/or photoelectrochemical cell or reactor used for the dissociation of water into its constituent parts, hydrogen ($H_2$) and oxygen ($O_2$), using either artificial or natural light. In theory, only solar energy (photons), water, and a catalyst are needed. Water splitting for hydrogen production holds particular interest since it utilizes water, an inexpensive and renewable source. Photocatalytic water splitting has the simplicity of using a catalyst (typically powder) in solution and sunlight to produce $H_2$ and $O_2$ from water. Photocatalytic water splitting has the ability to provide clean, renewable energy without producing greenhouse gases and without other adverse effects on the atmosphere.

When $H_2O$ is split into $O_2$ and $H_2$ requiring a photon energy of greater than 1.23 eV the stoichiometric ratio of the products is 2:1 in accordance with formula (I).

$$2H_2O \rightleftharpoons 2H_2 + O_2 \quad (I):$$

The process of water splitting for the production of hydrogen gas is a highly endothermic process ($\Delta H > 0$). There are general requirements for a photocatalyst to be useful for water splitting. The minimum potential difference (voltage) needed to split water is 1.23 V. The minimum band gap for successful water splitting is 1.23 eV, which corresponds to light of approximately 1008 nm. The process generally involve the photocatalyst absorbing a photon with sufficient energy (above 1.23 eV, $\lambda < \sim 1000$ nm), subsequently permitting photoexcited electrons and holes to separate and migrate to the surface of the photocatalyst material, reducing adsorbed species (i.e. water). The photocatalyst material must provide suitable band levels for water splitting, including a band gap greater than 1.23 eV and sufficiently small to make efficient use of the solar spectrum (~<3 eV). Additionally, high crystallinity and long term stability are desirable as defects can act as recombination sites.

In certain embodiments, the irradiating may be performed by a light source internal or external to a reactor and may provide the photon energy necessary to activate the chloroplast-like heterostructures of $Bi_2S_3$—ZnS of the present disclosure in any of their embodiments as a photocatalyst. The light source may be any known light source including, but not limited to, natural solar sunlight, UV light, laser light, incandescent light, and the like. Exemplary light sources include, but are not limited to, a xenon lamp, a mercurial lamp, a metal halide lamp, an LED lamp, a solar simulator, and a halogen lamp, preferably a xenon lamp including, but not limited to, a xenon arc lamp or a xenon flash lamp. In certain embodiments, two or more light sources may be used. In certain embodiments, sunlight may be used as the light source. In a preferred embodiment, the reaction mixture is irradiated with visible light having a wavelength of 300-800 nm, preferably 385-740, preferably 400-700 nm.

In a preferred embodiment, the light source is a xenon lamp, preferably a xenon arc lamp operated with a power rating of 200-500 W, preferably 225-450 W, preferably 250-400 W, preferably 275-350 W at a distance of 1-1000 cm from the reaction mixture, preferably 5-500 cm, preferably 10-250 cm, preferably 15-200 cm, preferably 20-100 cm from the reaction mixture.

In a preferred embodiment, the reactor is configured to expose the reaction mixture to the light source and the photocatalyst in a manner effective to photocatalytically split the water to $H_2$ and $O_2$. In certain embodiments, the photocatalyst is dispersed within the reaction mixture, and may further be filtered and recycled after the hydrogen gas has stopped evolving. In other embodiments, it is equally envisaged that the reactor and photocatalyst may be adapted to different deployed states of the photocatalyst. For example, reactors with suspended photocatalyst particles including, but not limited to annular slurry photoreactors, cascade photoreactors, and downflow contractor reactors may be employed which in certain embodiments may require an additional downstream separation unit for recovery of photocatalyst particles. In one embodiment, the photocatalyst is placed in a bag, preferably transparent, and the bag is immersed in the reaction mixture. Accordingly, the photocatalyst remains in the bag until the production of hydrogen gas is complete. A material that permits at least 50%, preferably at least 75%, preferably at least 80%, preferably at least 90%, preferably at least 95% of light of any portion of the light spectrum to pass through the bag may be considered transparent.

In certain embodiments, the photocatalyst may be present as a coating on an interior surface of a reactor. The photocatalyst may be suitably deposited on an interior surface of the reactor from solution or suspension, or by other deposition techniques including, but not limited to, pulsed layer deposition, physical vapor deposition, and atomic layer deposition. In certain embodiments, the coating has an average thickness of 10-500 µm, preferably 20-450 µm, preferably 40-400 µm, preferably 60-350 µm, preferably 80-320 µm, preferably 100-300 µm, preferably 120-250 µm, preferably 140-200 µm. In certain embodiments, the coating covers at least 10% of the interior surface area of a reactor, preferably at least 15%, preferably at least 20%, preferably at least 25%, preferably at least 30%, preferably at least 40%, preferably at least 50%, preferably at least 60%, preferably at least 70%, preferably at least 80%. In certain embodiments, reactors with the photocatalyst immobilized onto continuous inert carriers may be employed. Exemplary continuous inert carriers include, but are not limited to, photocatalytic membranes, mesoporous clays, nanofibers, nanowires, nanorods, and the like.

In a preferred embodiment, the irradiating is performed in an absence of oxygen. Oxygen may be eliminated from the reaction mixture by bubbling of an inert gas such as nitrogen or argon through the reaction mixture at a flow rate of 10-100 mL/min, preferably 20-80 mL/min, preferably 40-70 mL/min, preferably 45-60 mL/min or vacuumizing the reaction mixture and or reactor for a time period of 1-120 minutes, preferably 5-60 minutes, preferably 10-40 minutes to ensure an anaerobic atmosphere.

In a preferred embodiment, the solvent of the reaction mixture is aqueous comprising water which may be tap water, distilled water, doubly distilled water, deionized water, deionized distilled water, or combinations thereof. The general nature of the aqueous solution is not viewed as particularly limiting to the method of forming hydrogen gas described herein. In certain embodiments, the solvent of the reaction mixture may further may further comprise up to 30 vol % of an alcohol relative to the total volume of the solvent of the reaction mixture, preferably up to 25 vol %, preferably up to 20 vol %, preferably up to 15 vol %, preferably up to 10 vol %, preferably up to 5 vol %, preferably up to 2 vol % of an alcohol relative to the total volume of the solvent of the reaction mixture such as, for example, methanol, ethanol, and/or 2-propanol. Without wishing to be bound by theory, the alcohol may act as a hole scavenger during the irradiating.

In a preferred embodiment, the irradiating is performed in the presence of a hole scavenger or sacrificial agent, preferably to suppress the reverse reaction. In a preferred embodiment, the irradiating is performed in the presence of 0.1-1.0 moles of a hole scavenger or sacrificial agent per liter of the reaction mixture, preferably 0.15-0.95 moles, preferably 0.2-0.9 moles, preferably 0.3-0.75 moles, preferably 0.35-0.7 moles, preferably 0.4-0.6 moles of a hole scavenger or sacrificial agent per liter of the reaction mixture. Exemplary suitable hole scavengers include, but are not limited to, methanol, ethanol, 2-propanol, acetic acid, salicylic acid, ethylenediaminetetraacetic acid (EDTA), triethanolamine (TEA, TEOA), electron donors (e.g. organic hydrocarbons or inorganic ions such as $S_2^-/SO_3^{2-}$, $Ce^{4+}/Ce^{3+}$, and $IO_3^-/I^-$), carbonate salts (e.g $HCO_3^-$, $CO_3^-$, and $C_2O_6^{2-}$), and the like.

Photocatalysts can suffer from catalyst decay and recombination under operating conditions. In certain instances, catalyst decay may become a problem when using a sulfide-based photocatalyst, as the sulfide in the catalyst is oxidized to elemental sulfur at the same potentials often used to split water. Thus, sulfide-based photocatalysts are often not viable without sacrificial reagents (i.e. hole scavengers consuming holes produced in the valence) such as, for example sodium sulfide, to replenish any sulfur lost, which may effective change the main reaction to one of hydrogen evolution as opposed to water splitting.

In a preferred embodiment the irradiating is performed in the presence of a hole scavenger or sacrificial agent, and the hole scavenger or sacrificial agent is at least one selected from the group consisting of $Na_2S$ and $Na_2SO_3$. Often, $Na_2S$ and/or $Na_2SO_3$ may be employed as sacrificial reagents in the presence of visible light irradiation. Generally, $Na_2S$ and $Na_2SO_3$ have been widely used in such reactions as they act as hole scavengers ($S^{2-}+SO_3^{2-}+2h^+=S_2O_3^{2-}$). In a preferred embodiment, the reaction mixture has a molar concentration of $Na_2S$, $Na_2SO_3$, or both in a range of 0.1-1.0 M, preferably 0.15-0.8 M, preferably 0.2-0.6 M, preferably 0.25-0.55 M, preferably 0.3-0.5 M. In a preferred embodiment, the reaction mixture has a molar concentration of $Na_2S$ in a range of 0.1-0.6 M, preferably 0.15-0.55 M, preferably 0.2-0.5 M, preferably 0.25-0.45 M, preferably 0.3-0.4 M. In a preferred embodiment, the reaction mixture has a molar concentration of $Na_2SO_3$ in a range of 0.1-0.4 M, preferably 0.15-0.35 M, preferably 0.2-0.3 M.

Figure 15:
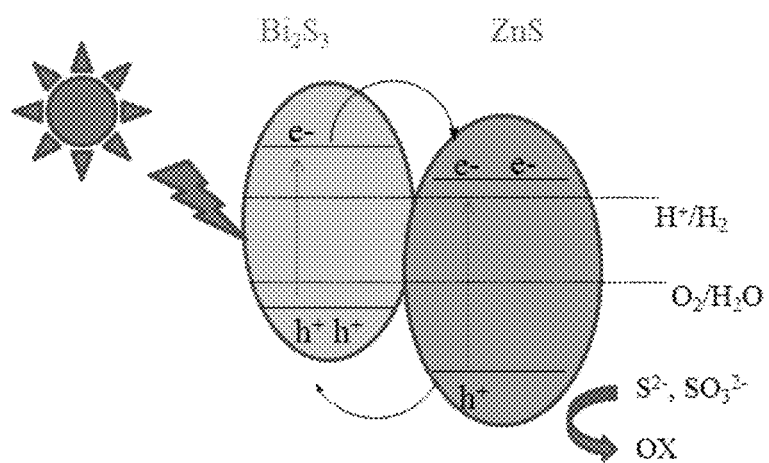
FIG. 15 is a schematic illustration of the charge separation and transfer of a prepared $Bi_2S_3$—ZnS photocatalyst product.

Without wishing to be bound by theory, it is envisioned that the incorporation of ZnS with $Bi_2S_3$ enhances photocatalytic activity due to effective charge separation. It is envisioned that the formation of heterostructures between ZnS and $Bi_2S_3$ improve the mobility of photogenerated electron-hole pairs and facilitates the charge transportation towards the surface of the catalyst, resulting in high photocatalytic activity (e.g. water splitting). Under visible light irradiation, electron transitions occur simultaneously in both $Bi_2S_3$ and ZnS. Due to the difference in energy band gap positions, photoexcited electron transfer from the conduction band of $Bi_2S_3$ to that of ZnS to produce hydrogen, while holes transfer from the valence band of ZnS to that of $Bi_2S_3$ (FIG. 15). This results in charge transfer separation of photogenerated electron-hole pairs and thus enhancing photocatalytic hydrogen production activity. In a preferred embodiment, a $Na_2S$ and $Na_2SO_3$ mixture is used as a sacrificial agent ($S^{2-}$, $SO_3^{2-}$) and as a sacrificial agent or hole scavenger consumes holes produced in the valence band.

In a preferred embodiment, 0.1-5.0 grams of the photocatalyst is present per liter of the reaction mixture, preferably 0.15-4.0 g/L, preferably, preferably 0.2-3.5 g/L, preferably 0.25-3.0 g/L, preferably 0.3-2.5 g/L, preferably 0.325-2.0 g/L, preferably 0.35-1.5 g/L, preferably 0.375-1.0 grams of the photocatalyst is present per liter of the reaction mixture.

In a preferred embodiment, the irradiating is performed at a temperature of 10-70° C., preferably 10-60° C., preferably 10-50° C., preferably 15-40° C., preferably 18-35° C., preferably 20-30° C., preferably 22-28° C. In a preferred embodiment, the irradiating is performed at a pressure of 0.5-2.0 atm, preferably 0.5-1.7 atm, preferably 0.7-1.5 atm, preferably 0.9-1.2 atm. In a preferred embodiment, the irradiating is performed for a time period of 1-720 minutes, preferably 5-660 minutes, preferably 15-600 minutes, preferably 30-540 minutes, preferably 60-480 minutes, preferably 120-420 minutes.

In a preferred embodiment, hydrogen gas is formed or produced at a rate in a range of 50-300 $\mu$mol h$^{-1}$, preferably 60-280 $\mu$mol h$^{-1}$, preferably 70-260 $\mu$mol h$^{-1}$, preferably 80-240 h$^{-1}$, preferably 90-220 $\mu$mol h$^{-1}$, preferably 100-200 $\mu$mol h$^{-1}$, preferably 120-190 $\mu$mol h$^{-1}$, preferably 140-185 $\mu$mol h$^{-1}$, preferably 150-180 $\mu$mol h$^{-1}$. In a preferred embodiment, hydrogen gas is formed or produced at a rate of at least 60 $\mu$mol h$^{-1}$, preferably at least 70 h$^{-1}$, preferably at least 80 $\mu$mol h$^{-1}$, preferably at least 90 $\mu$mol h$^{-1}$, preferably at least 100 $\mu$mol h$^{-1}$, preferably at least 120 $\mu$mol h$^{-1}$, preferably at least 140 $\mu$mol h$^{-1}$, preferably at least 160 $\mu$mol h$^{-1}$, preferably at least 180 $\mu$mol h$^{-1}$. In a preferred embodiment, hydrogen gas is formed or produced at a rate of up to 295 $\mu$mol h$^{-1}$, preferably up to 290 $\mu$mol h$^{-1}$, preferably up to 285 $\mu$mol h$^{-1}$, preferably up to 280 $\mu$mol h$^{-1}$, preferably up to 275 $\mu$mol h$^{-1}$, preferably up to 270 $\mu$mol h$^{-1}$, preferably up to 265 $\mu$mol h$^{-1}$, preferably up to 260 $\mu$mol h$^{-1}$. In a preferred embodiment, this rate of hydrogen gas evolution is achieved in 15-500 minutes of irradiating, preferably 30-450 minutes, preferably 60-400 minutes, preferably 120-360 minutes.

In certain embodiments, the method further comprises i) recovering the photocatalyst after the hydrogen gas is produced and ii) recycling the recovered photocatalyst in at least two reaction cycles. In certain embodiments, the photocatalyst may be separated by removing a bag containing the photocatalyst, dialysis in a solvent, or using a microfilter, or a paper filter. As used herein the phrase "recycling the photocatalyst" may refer to a process whereby the photocatalyst or a composition thereof is first washed by an organic and/or aqueous solvent, dried and then added to a new batch of reactants or solution. In certain embodiments, preferred organic solvents for washing the photocatalyst and/or dialysis include, but are not limited to, methanol, acetone, ethanol, tetrahydrofuran, acetonitrile, dichloromethane, ether, glycol ether, acetamide, dimethyl acetamide, dimethyl sulfoxide, or combinations thereof. In certain embodiments, the photocatalyst or a composition thereof may be dried in vacuum, and/or with heating, for example, the photocatalyst may be dried in a vacuum oven. In certain embodiments, the dried photocatalyst may be stored in a desicator prior to or until a subsequent or next reaction run.

In certain embodiments, the photocatalyst is recycled for at least 2 reaction cycles, preferably at least 3 reaction cycles, preferably at least 4 reaction cycles, preferably at least 5 reaction cycles, preferably at least 6 reaction cycles, preferably at least 8 reaction cycles, preferably at least 10 reaction cycles, preferably at least 12 reaction cycles, preferably at least 15 reaction cycles, preferably at least 20 reaction cycles, preferably at least 25 reaction cycles, preferably at least 30 reaction cycles.

In a preferred embodiment, the average rate of hydrogen gas evolution or production may decrease by less than 30%, preferably less than 25%, preferably less than 22%, preferably less than 20%, preferably less than 15%, preferably less than 12%, preferably less than 10%, preferably less than 8%, preferably less than 6%, preferably less than 5%, preferably less than 4%, preferably less than 3%, preferably less than 2%, or more preferably the average rate of hydrogen gas evolution or production may decrease by less than 1% after at least 2 reaction cycles, preferably at least 3 reaction cycles, preferably at least 4 reaction cycles, preferably at least 5 reaction cycles, preferably at least 6 reaction cycles, preferably at least 8 reaction cycles, preferably at least 10 reaction cycles, preferably at least 12 reaction cycles, preferably at least 15 reaction cycles, preferably at least 20 reaction cycles, preferably at least 25 reaction cycles, preferably at least 30 reaction cycles.

In a preferred embodiment, hydrogen gas is formed at a rate of 30-300 $\mu$mol h$^{-1}$, preferably 40-280 $\mu$mol h$^{-1}$, preferably 60-260 $\mu$mol h$^{-1}$, preferably 80-240 $\mu$mol h$^{-1}$, preferably 90-220 $\mu$mol h$^{-1}$, preferably 100-200 $\mu$mol h$^{-1}$, preferably 120-190 $\mu$mol h$^{-1}$, preferably 140-185 $\mu$mol h$^{-1}$, preferably 150-180 $\mu$mol h$^{-1}$ in the at least 2 reaction cycles, preferably at least 3 reaction cycles, preferably at least 4 reaction cycles, preferably at least 5 reaction cycles, preferably at least 6 reaction cycles, preferably at least 8 reaction cycles, preferably at least 10 reaction cycles, preferably at least 12 reaction cycles, preferably at least 15 reaction cycles, preferably at least 20 reaction cycles, preferably at least 25 reaction cycles, preferably at least 30 reaction cycles. In a preferred embodiment, hydrogen gas is formed or produced at a rate of at least 30 $\mu$mol h$^{-1}$, preferably at least 40 $\mu$mol h$^{-1}$, preferably at least 50 $\mu$mol h$^{-1}$, preferably at least 60 $\mu$mol h$^{-1}$, preferably at least 70 $\mu$mol h$^{-1}$, preferably at least 80 $\mu$mol h$^{-1}$, preferably at least 90 $\mu$mol h$^{-1}$, preferably at least 100 $\mu$mol h$^{-1}$, preferably at least 120 $\mu$mol h$^{-1}$, preferably at least 140 $\mu$mol h$^{-1}$, preferably at least 160 $\mu$mol h$^{-1}$, preferably at least 180 $\mu$mol h$^{-1}$, preferably at least 200 $\mu$mol h$^{-1}$, preferably at least 210 $\mu$mol h$^{-1}$, preferably at least 220 $\mu$mol h$^{-1}$, preferably at least 230 $\mu$mol h$^{-1}$, preferably at least 240 $\mu$mol h$^{-1}$, preferably at least 250 $\mu$mol h$^{-1}$, preferably at least 275 $\mu$mol h$^{-1}$ in the at least 2 reaction cycles, preferably at least 3 reaction cycles, preferably at least 4 reaction cycles, preferably at least 5 reaction cycles, preferably at least 6 reaction cycles, preferably at least 8 reaction cycles, preferably at least 10 reaction cycles, preferably at least 12 reaction cycles, preferably at least 15 reaction cycles, preferably at least 20 reaction cycles, preferably at least 25 reaction cycles, preferably at least 30 reaction cycles.

In certain embodiments, the evolution or production of hydrogen gas may be measured by methods well known to those of ordinary skill in the art including, but not limited to, gas chromatography, a gas syringe, and/or displacement of water.

In certain embodiments, it is equally envisaged that the photocatalyst of the present disclosure in any of its embodiments may be employed to decontaminate and/or remediate aqueous water sources. Non-limiting examples of aqueous solution and/or water sources and systems include, but are not limited to, surface water that collects on the ground or in a stream, aquifer, river, lake, reservoir, or ocean, ground water that is obtained by drilling wells, run-off, industrial water, public water storage towers, public recreational pools, and/or bottled water. Methods for decontaminating and/or remediating aqueous solutions and/or water sources according to the present disclosure may include contacting the photocatalyst of the present disclosure in any of its embodiments with a contaminated water source and/or system. The methods may be carried out in tanks, containers, or small scale applications in both batch mode and fixed-bed or column mode.

In certain embodiments, it is equally envisaged that the photocatalyst of the present disclosure in any of its embodiments may be employed to photodegrade organic pollutants. Exemplary organic pollutants include, but are not limited to, pesticides such as, for example, aldrin, chlordane, DDT, dieldrin, endrin, heptachlor, hexachlorobenzene, mirex, toxaphene, industrial chemicals such as, for example, hexachlorobenzene, polychlorinated biphenyls (PCBs), polyaromatic hydrocarbons (PAHs), tetrachloroethylene, methyl tertiary butyl ether, and by-products such as, for example, hexachlorobenzene, polychlorinated dibenzo-p-dioxins, polychlorinated dibenzofurans, and the like. It is equally envisaged that the photocatalyst of the present disclosure in any of its embodiments may be employed in one or more additional photocatalysis reactions including, but not limited to, oxidation of organic contaminants, and/or conversion of carbon dioxide to gaseous hydrocarbons.

Having generally described this disclosure, a further understanding can be obtained by reference to certain specific examples which are provided herein for purposes of illustration only and are not intended to be limiting unless otherwise specified. The examples below are intended to further illustrate protocols for preparing and characterizing the photocatalysts in the form of chloroplast-like heterostructures of the present disclosure. Further, they are intended to illustrate assessing the properties of these materials and assessing their performance in photocatalytic reactions, such as hydrogen gas producing reactions. They are not intended to limit the scope of the claims.

EXAMPLE 1

Preparation of Photocatalysts

Analytical grade $BiCl_3$, $Zn(CH_3COO)_2 \cdot 2H_2O$, ethylene glycol, thiourea, polyvinyl pyrrolidone (PVP-K30) and ethanol were purchased from local suppliers and used as received without further purification. To prepare the photocatalysts 0.5 mmol of $BiCl_3$ and 1.0 mmol of $Zn(CH_3COO)_2 \cdot 2H_2O$ was added to 20 mL of ethylene glycol followed by the addition of 3.0 mmol of thiourea and 0.5 g of polyvinyl pyrrolidone (PVP-K30). The mixture was stirred well at room temperature and then transferred into a Teflon-lined autoclave and heated in an electric oven at 200° C. for 20 hours. The autoclave was then cooled naturally, and the product was centrifuged and washed several times with deionized water and ethanol before being dried at 60° C. for 24 hours.

EXAMPLE 2

Characterization of the Prepared Photocatalysts

Powder X-ray diffraction (XRD) patterns were obtained using a Philips PW/1840 diffractometer (40 kV, 25 mA) with Cu-Ka radiation, k=1.542 Å. Data was collected in the 2θ angle range of 20-70° at a rate of 2° C./min. The element composition was determined by a Horiba EX250 X-ray energy-dispersive (EDX) spectrometer associated with a field emission scanning electron microscope (FE-SEM; Hitachi, S-4800). A UV-Vis diffuse reflectance spectra of the product was obtained on a UV-Vis spectrophotometer (UV-2550, Shimadzu, Japan). $BaSO_4$ was used as a reflectance standard in a UV-Vis diffuse reflectance experiment and the spectra was recorded in a range of 200-800 nm.

Figure 2:
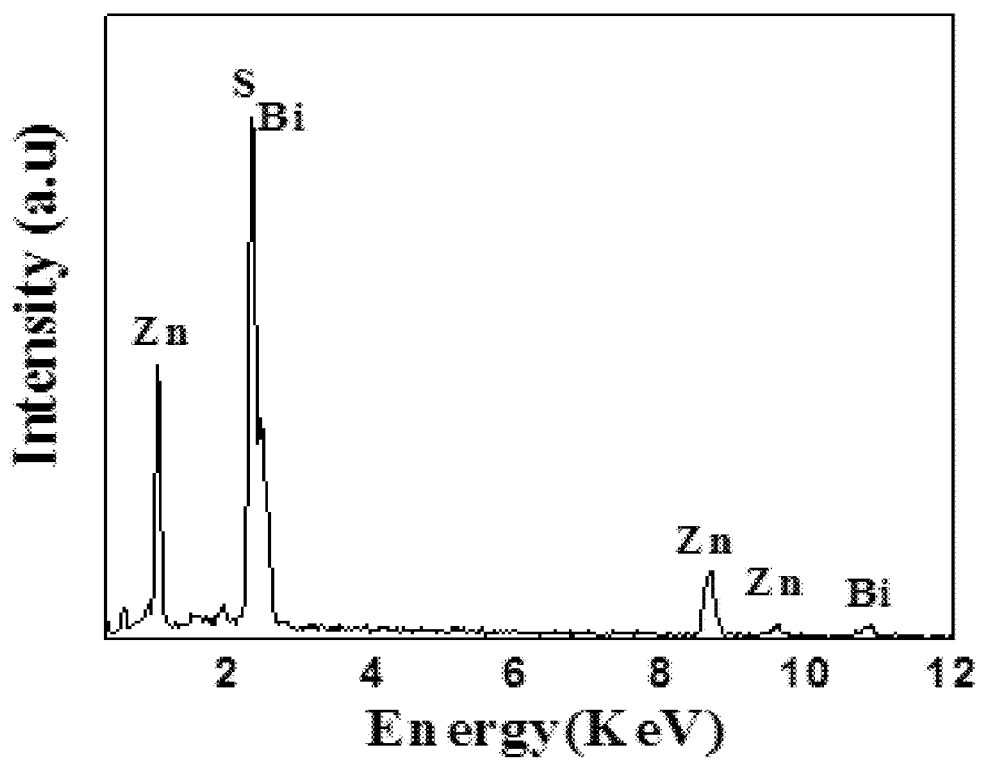
FIG. 2 shows an energy dispersive X-ray (EDX) pattern of a prepared $Bi_2S_3$—ZnS photocatalyst product.
Figure 3:
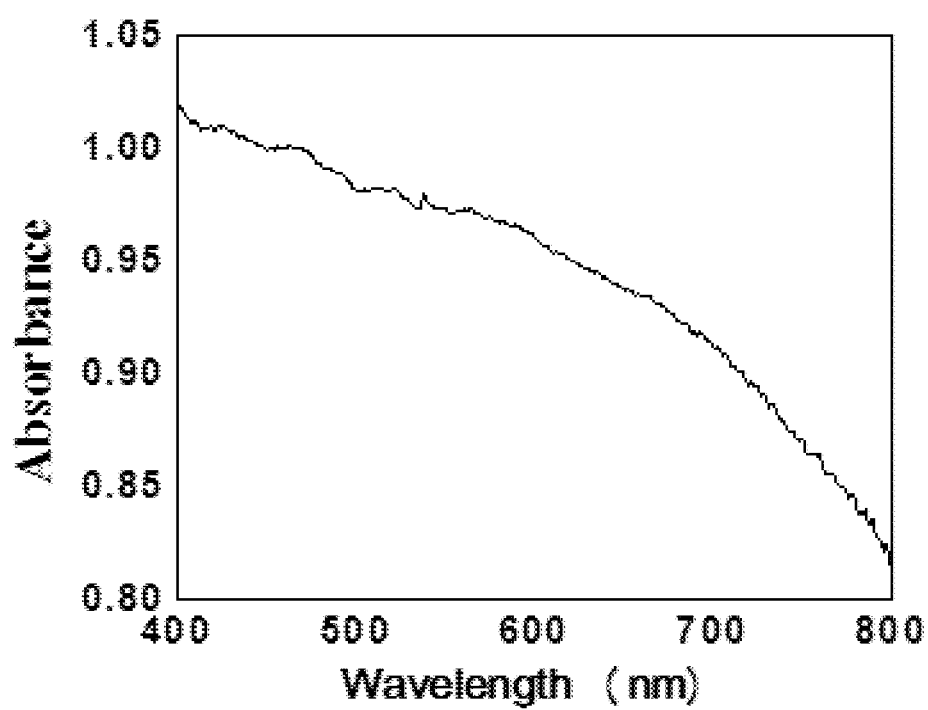
FIG. 3 shows a diffuse reflectance ultraviolet-visible (DR-UV-Vis) absorption spectra of a prepared $Bi_2S_3$—ZnS photocatalyst.

The phase purity of the as-synthesized product was determined by powder X-ray diffraction (XRD). FIG. 1 shows the X-ray diffraction (XRD) patter of the prepared photocatalyst. The XRD peaks pattern for the product of the solvothermal process can be indexed to the orthorhombic phase of $Bi_2S_3$—ZnS. The ZnS peaks seem to be incorporated into the $Bi_2S_3$ sites. Further, the XRD patterns are in good agreement with those from the standard cards (Joint Committee on Powder Diffraction Standards, JCPDS no. 65-2431). FIG. 2 shows the X-ray energy-dispersive (EDX) spectrum of the as-synthesized photocatalyst product. The EDX pattern contains Zn, S, and Bi, confirming the composition of the product. FIG. 3 shows the diffuse reflectance UV-Vis (DR-UV-Vis) spectra of the prepared photocatalyst. The DR-UV-Vis spectra of the as-synthesized $Bi_2S_3$—ZnS exhibited strong spectral response both in the UV and visible range which indicates that the as-synthesized product can be used as a visible light driven photocatalyst.

EXAMPLE 3

Morphology Characterization of the Prepared Photocatalysts

Figure 4:
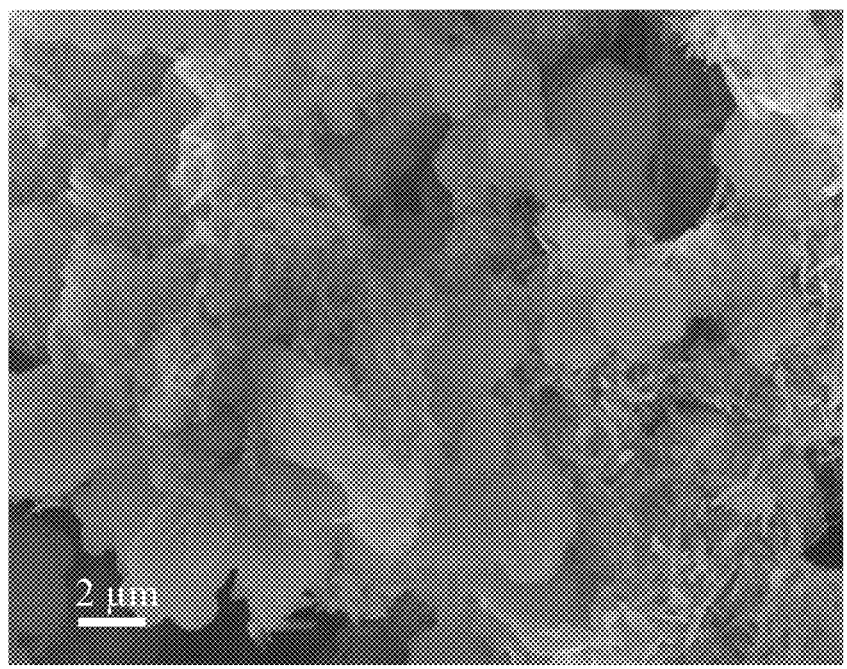
FIG. 4 is a scanning electron microscopy (SEM) image of a $_{Bi2S3}$-ZnS photocatalyst prepared at 200° C. in the absence of polyvinyl pyrrolidone (PVP).
Figure 5:
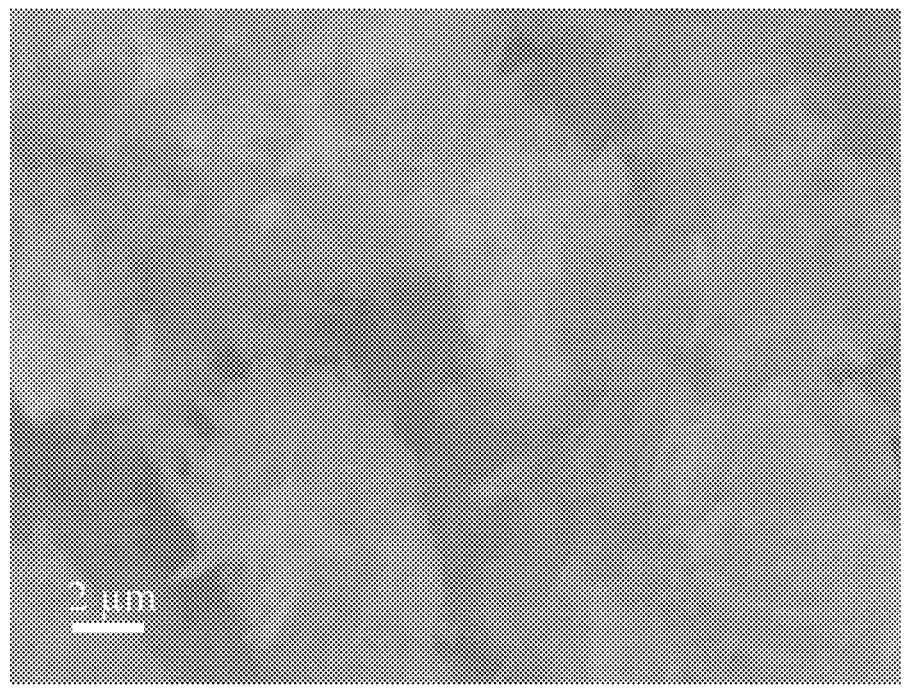
FIG. 5 is a SEM image of a $Bi_2S_3$—ZnS photocatalyst prepared at 200° C. in the presence of 0.1 g of PVP.
Figure 6:
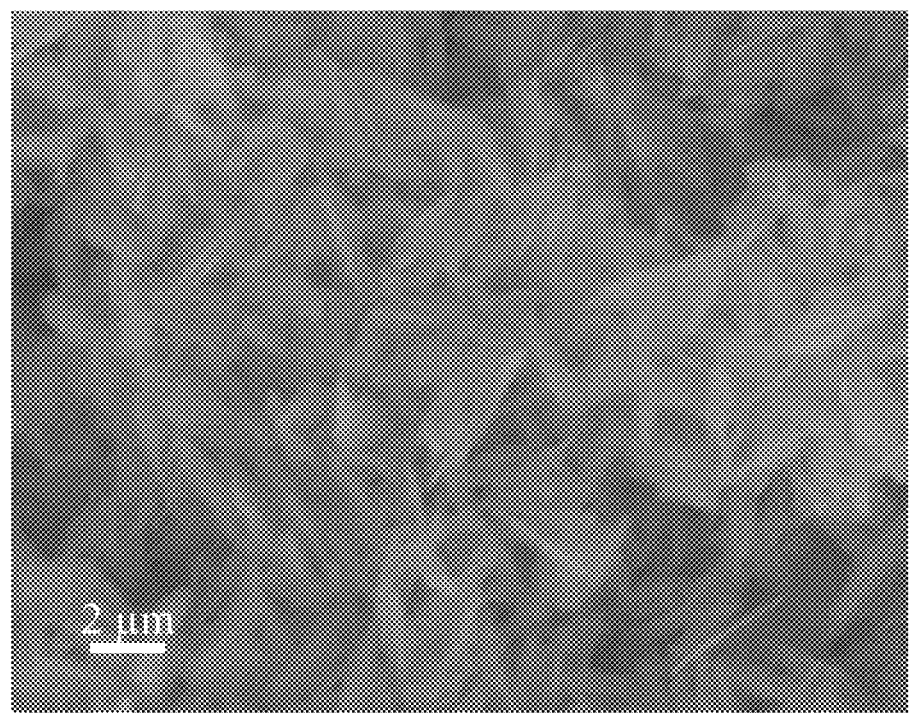
FIG. 6 is a SEM image of a $Bi_2S_3$—ZnS photocatalyst prepared at 200° C. in the presence of 0.2 g of PVP.
Figure 7:
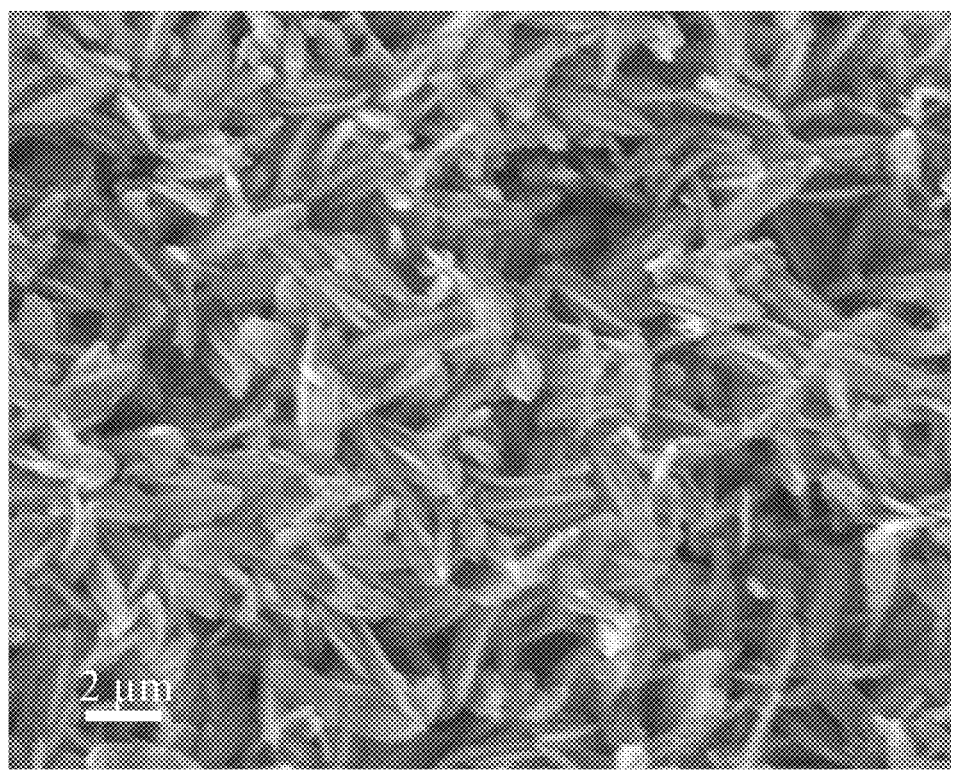
FIG. 7 is a SEM image of a $Bi_2S_3$—ZnS photocatalyst prepared at 200° C. in the presence of 0.5 g of PVP.

The morphologies of the as-synthesized products were characterized by a field emission scanning electron microscope (FE-SEM; Hitachi, S-4800) at an acceleration voltage of 10.0 kV. The morphologies of the as-synthesized photocatalyst products were investigated by field-emission scanning electron microscopy (FE-SEM). To identify the role of polyvinyl pyrrolidone (PVP) in the formation of chloroplast-like structures, the reaction was performed without PVP and with different amounts of PVP. FIG. 4 presents the SEM image of the $Bi_2S_3$—ZnS product obtained without the addition of PVP to the reaction mixture. FIG. 5 presents the SEM image of the $Bi_2S_3$—ZnS product prepared at 200° C. with 0.1 g of PVP in the reaction mixture. FIG. 6 presents the SEM image of the $Bi_2S_3$—ZnS product prepared at 200° C. with 0.2 g of PVP in the reaction mixture. FIG. 7 presents the SEM image of the $Bi_2S_3$—ZnS product prepared at 200° C. with 0.5 g of PVP in the reaction mixture. It can be clearly observed that when there is no addition of PVP in the reaction mixture (FIG. 4), the product obtained was aggregated and in the form of mesoporous spheres. When 0.1 g (FIG. 5) of PVP was employed in the reaction mixture, the product was still mesoporous and comprised some flakes. Upon further increasing the amount of PVP to 0.2 g (FIG. 6) underdeveloped chloroplast-like were formed. Increasing the amount of PVP addition to 0.5 g (FIG. 7) in the reaction mixture resulted in the formation of well-developed chloroplast-like structure of the $Bi_2S_3$—ZnS photocatalyst product.

Accordingly, the results indicated that PVP played an important role in the formation of chloroplast-like structures. A low amount of PVP in the reaction mixture was not adequate to control the shape of the nanoparticles. Upon an increase to a proper amount of PVP, a controlled morphology can be obtained. The PVP appeared to function well as a capping agent necessitated in order to protect the product from agglomeration [J. H. Huang, L. Gao, Cryst. Growth Des. 6 (2006) 1528-1532; and O. Jyotiranjan, P. Roy, S. K. Srivastava, B. B. Nayak, A. K. Saxena, Cryst. Growth Des.

8 (2008) 2019-2023.—each incorporated herein by reference in its entirety]. Furthermore, PVP is able to adsorb selectively on the facet of crystals and control the growth of crystals. Additionally, PVP may help to promote the self-assembly of nuclei at an initial stage of the crystal growth.

EXAMPLE 4

Formation Mechanism of the Prepared Photocatalysts

Figure 8A:
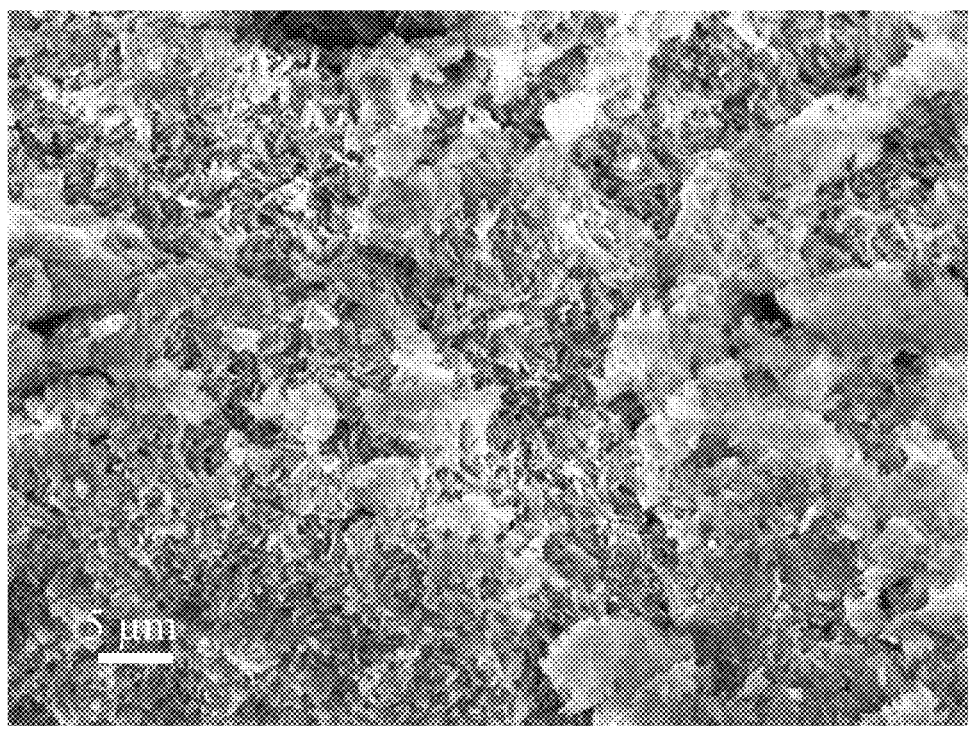
FIG. 8A is a SEM image of a $Bi_2S_3$—ZnS photocatalyst prepared at 200° C. with a reaction time of 1 hour at a 5 μm scale.
Figure 8B:
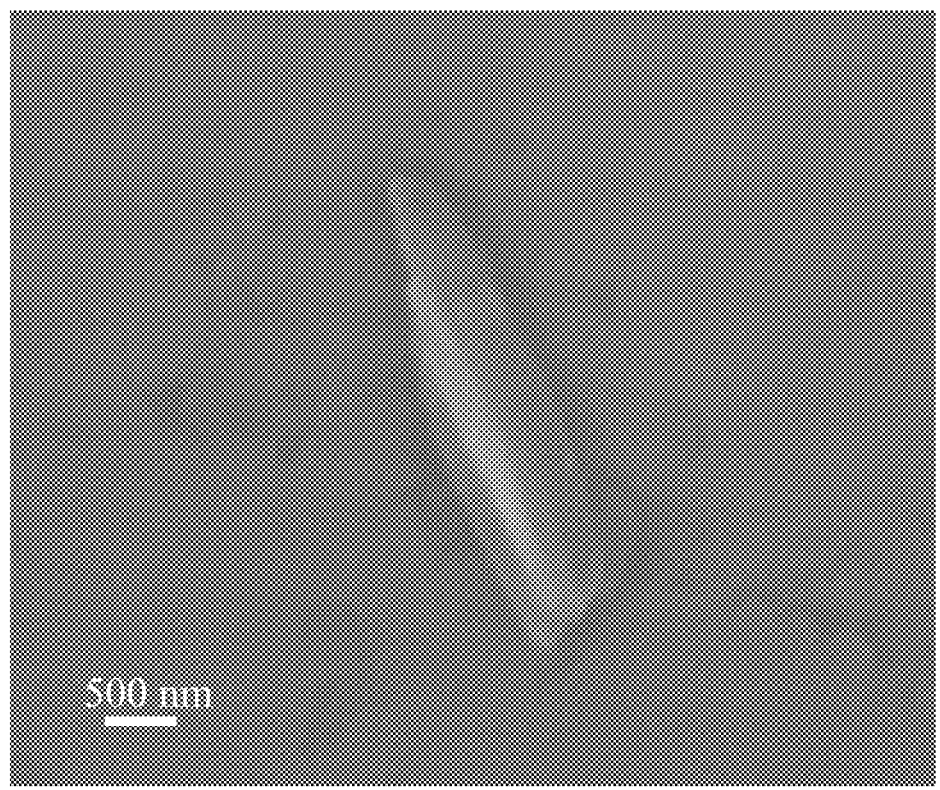
FIG. 8B is a high magnification SEM image of a $Bi_2S_3$—ZnS photocatalyst prepared at 200° C. with a reaction time of 1 hour at a 500 nm scale.
Figure 9A:
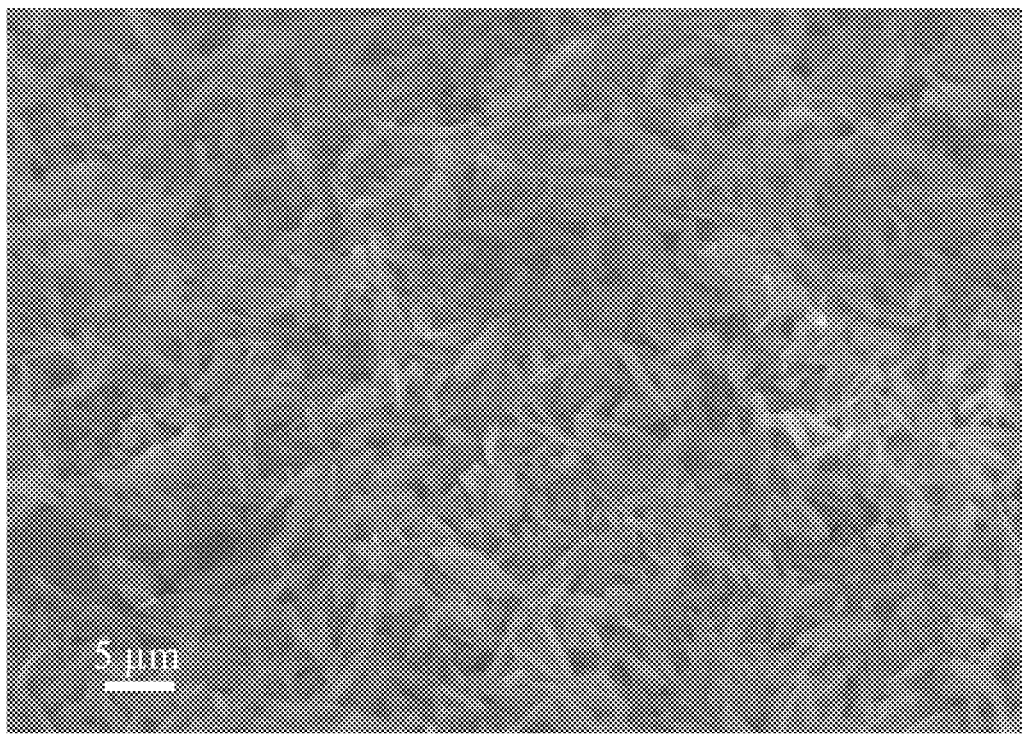
FIG. 9A is a SEM image of a $Bi_2S_3$—ZnS photocatalyst prepared at 200° C. with a reaction time of 5 hours at a 5 μm scale.
Figure 9B:
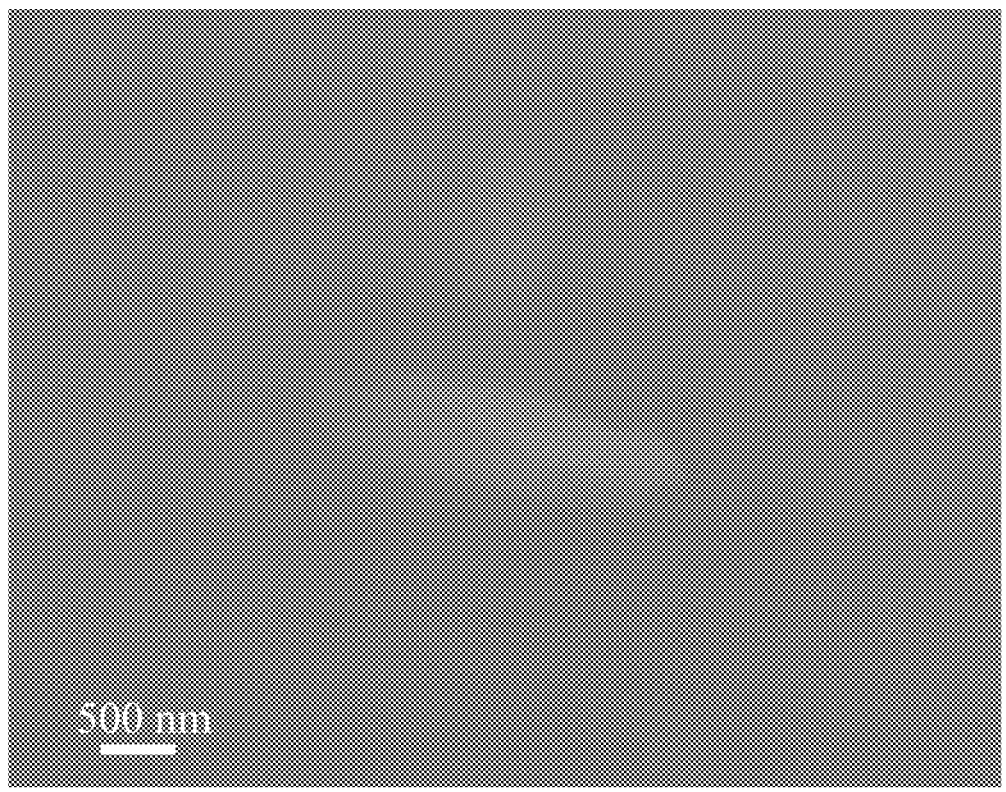
FIG. 9B is a high magnification SEM image of a $Bi_2S_3$—ZnS photocatalyst prepared at 200° C. with a reaction time of 5 hours at a 500 nm scale.
Figure 10A:
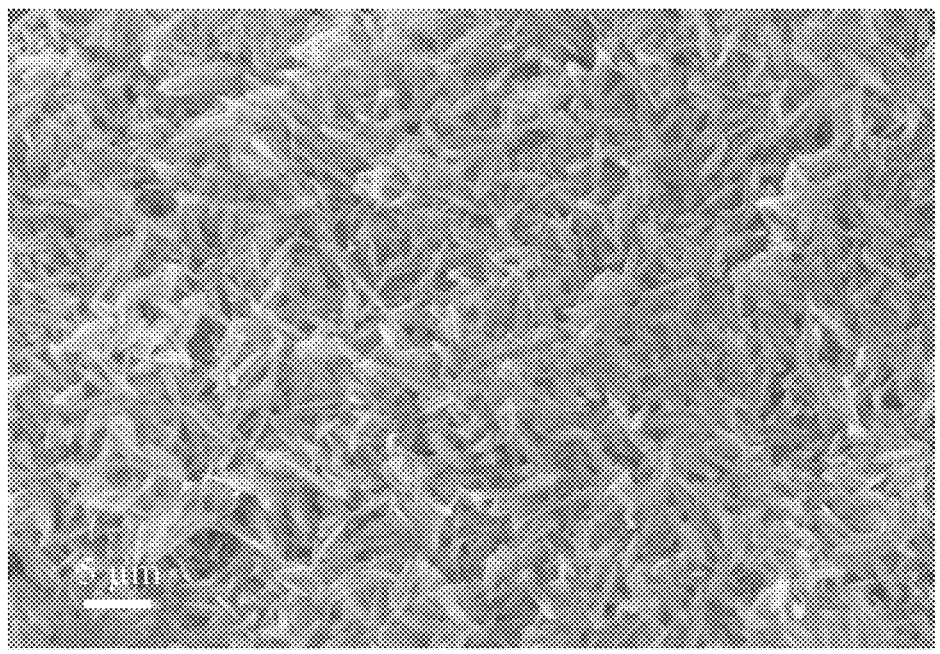
FIG. 10A is a SEM image of a $Bi_2S_3$—ZnS photocatalyst prepared at 200° C. with a reaction time of 10 hours at a 5 μm scale.
Figure 10B:
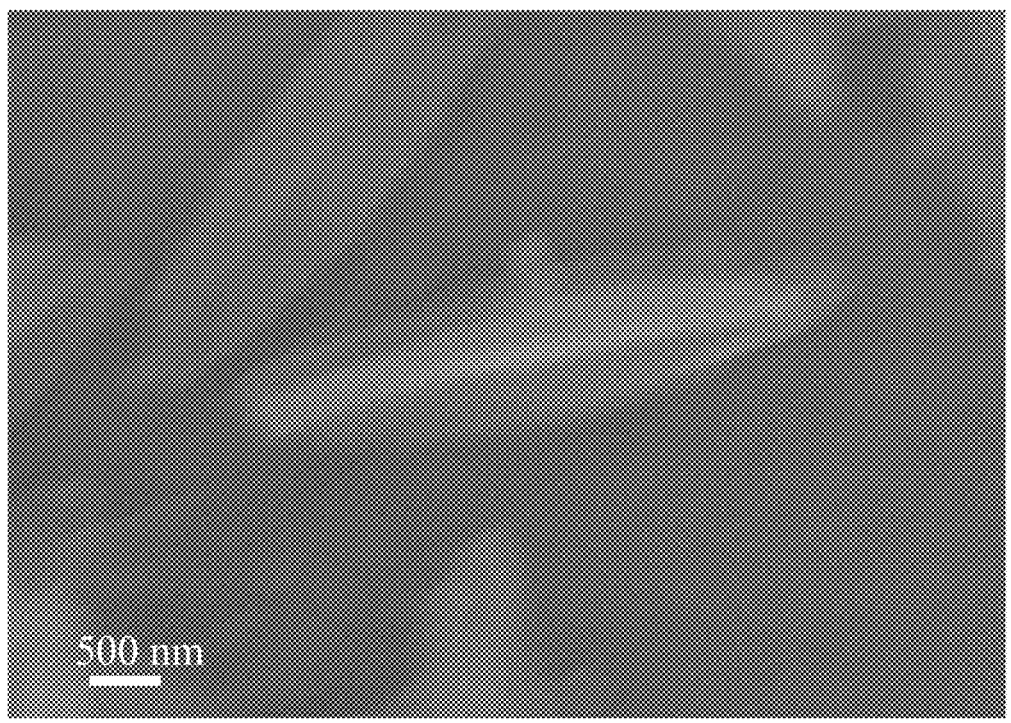
FIG. 10B is a high magnification SEM image of a $Bi_2S_3$—ZnS photocatalyst prepared at 200° C. with a reaction time of 10 hours at a 500 nm scale.
Figure 11A:
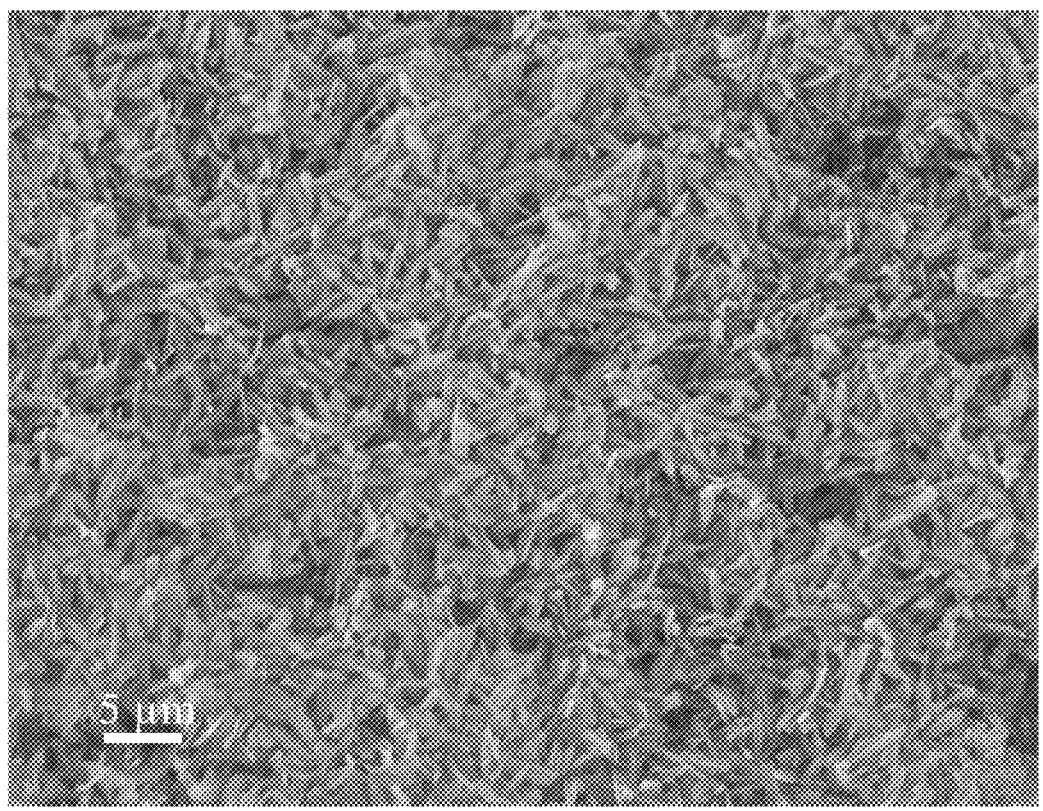
FIG. 11A is a SEM image of a $Bi_2S_3$—ZnS photocatalyst prepared at 200° C. with a reaction time of 20 hours at a 5 μm scale.
Figure 11B:
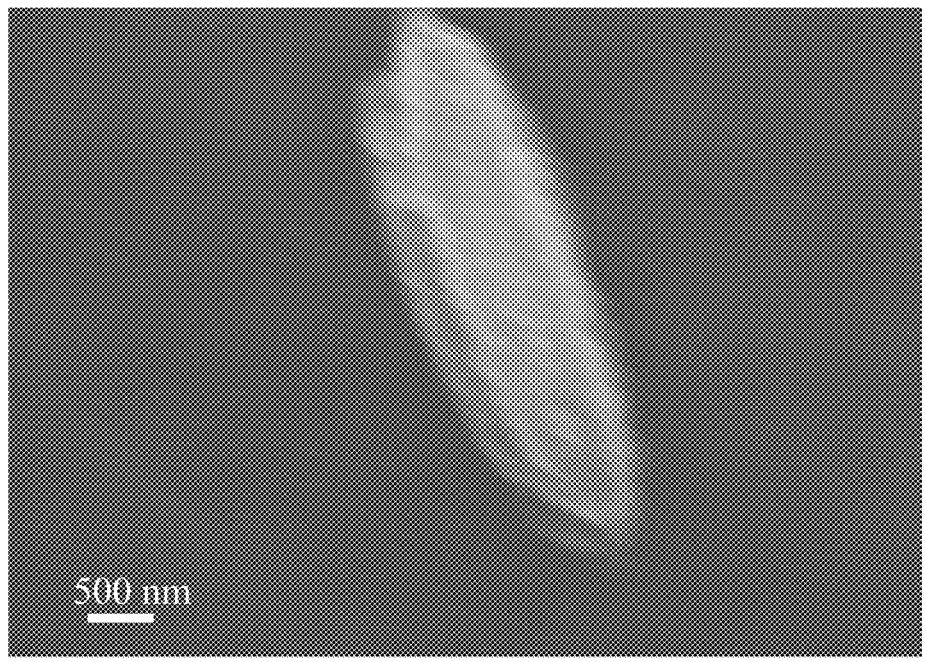
FIG. 11B is a high magnification SEM image of a $Bi_2S_3$—ZnS photocatalyst prepared at 200° C. with a reaction time of 20 hours at a 500 nm scale.

In order to investigate the formation mechanism of the chloroplast-like structures of the $Bi_2S_3$—ZnS photocatalyst and to reveal the evolution process, reactions were performed with different reaction duration times (i.e. 1 hour, 5 hours, 10 hours, and 20 hours). FIG. 8A is a scanning electron microscopy (SEM) image of the obtained $Bi_2S_3$—ZnS photocatalyst product prepared at 200° C. at a reaction time of 1 hour at a 5 μm scale. FIG. 8B is a high magnification SEM image of the obtained $Bi_2S_3$—ZnS photocatalyst product prepared at 200° C. at a reaction time of 1 hour at a 500 nm scale. FIG. 9A is a SEM image of the obtained $Bi_2S_3$—ZnS photocatalyst product prepared at 200° C. at a reaction time of 5 hours at a 5 μm scale. FIG. 9B is a high magnification SEM image of the obtained $Bi_2S_3$—ZnS photocatalyst product prepared at 200° C. at a reaction time of 5 hours at a 500 nm scale. FIG. 10A is a SEM image of the obtained $Bi_2S_3$—ZnS photocatalyst product prepared at 200° C. at a reaction time of 10 hours at a 5 μm scale. FIG. 10B is a high magnification SEM image of the obtained $Bi_2S_3$—ZnS photocatalyst product prepared at 200° C. at a reaction time of 10 hours at a 500 nm scale. FIG. 11A is a SEM image of the obtained $Bi_2S_3$—ZnS photocatalyst product prepared at 200° C. at a reaction time of 20 hours at a 5 μm scale. FIG. 11B is a high magnification SEM image of the obtained $Bi_2S_3$—ZnS photocatalyst product prepared at 200° C. at a reaction time of 20 hours at a 500 nm scale.

When the reaction was performed for 1 hour, the product was mainly mesoporous containing some underdeveloped chloroplast-like structures and aggregates (FIG. 8A and FIG. 8B). When the reaction was continued for 5 hours, the underdeveloped chloroplast-like structures further grew, but there were still some aggregates present (FIG. 9A and FIG. 9B). Upon increasing the reaction time to 10 hours, chloroplast like structures started to develop with better shape (FIG. 10A and FIG. 10B). Well-developed chloroplast-like structures were formed when the reaction time was kept at 20 hours (FIG. 11A and FIG. 11B).

FIG. 12 shows a proposed formation mechanism derived after careful observation of these results. Initially, nuclei are formed in the solution then these nuclei self-assembled to form flakes. The selective adsorption of PVP on the surface of the product may be responsible for the formation of these flakes and promoting a tune self-assembly. It has been reported that the self-assembly of nanocrystals may be determined by van der Waals forces and hydrogen bonding existing among certain organic molecules (i.e. surfactants) on the surface of nanomaterials [Y. L. Feng, W. C. Lu, L. M. Zhang, X. H. Bao, B. H. Yue, Y. lv, X. F. Shang, Cryst. Growth Des. 8 (2008) 1426-1429; and J. F. Banfield, S. A. Welch, H. Z. Zhang, T. T. Ebert, R. L. Penn, Science 289 (2000) 751-754.—each incorporated herein by reference in its entirety]. As the reaction proceeded further, the presence of some unassembled nuclei resulted in further assembly with flakes to form elongated shapes or version of these flakes. Finally, the further growth of elongated shapes results in the formation of chloroplast-like structures. The formation of chloroplast-like structures may be due to the relatively higher free energies of those crystal faces along the preferred direction. It is possible that PVP may have three different roles in the formation of the chloroplast-like structures: i) to prevent the aggregation of $Bi_2S_3$—ZnS during the initial stage of the formation of the nanoflakes, ii) to selectively adsorb onto the facet of crystals, and iii) to promote the self-assembly.

EXAMPLE 5

Evaluation of Photocatalytic Activity of the Prepared Photocatalysts

A closed gas circulation system equipped with an external irradiation cell, which was placed about 20 cm under a 300 W xenon (Xe) lamp was employed in a photocatalytic hydrogen production experiment. For the photocatalytic activity experiment, 30 mg of catalyst was ultrasonically dispersed for 15 minutes in 80 mL of an aqueous solution containing 0.35 M $Na_2S$ and 0.25 M $Na_2SO_3$. Prior to irradiation, the suspension of the catalyst in the reactor was vacuumized for 15 minutes to remove the dissolved oxygen completely and ensure the reactor was under an anaerobic atmosphere, the suspension was then irradiated by the Xe lamp. The amount of evolved gas after a given interval of irradiation was determined in situ by a gas chromatograph (TECHCOMP, GC 7890-II), equipped with a thermal conductivity detector containing an MS-5A column, which was connected to the closed gas circulating line using nitrogen as a carrier gas.

Figure 13:
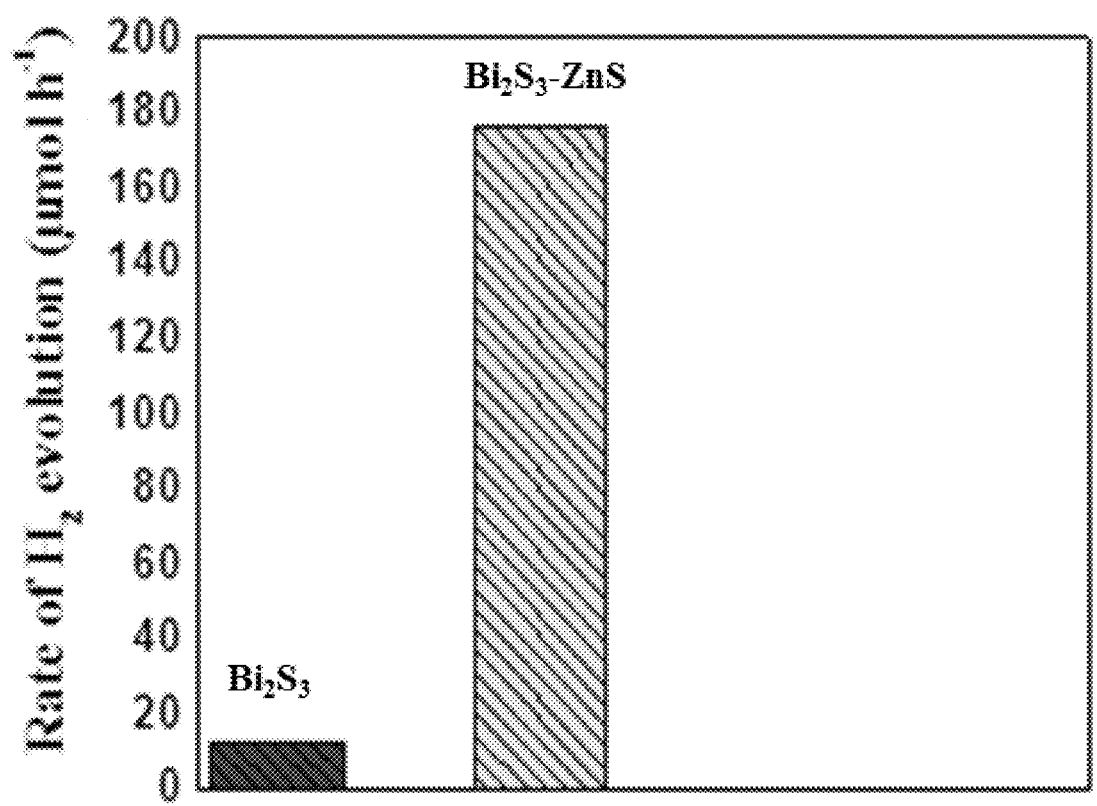
FIG. 13 is a graph illustrating the photocatalytic hydrogen production activities from an aqueous solution containing a mixture of $Na_2S$ and $Na_2SO_3$ employing a $Bi_2S_3$ photocatalyst and a prepared $Bi_2S_3$—ZnS phototcatalyst.
Figure 14:
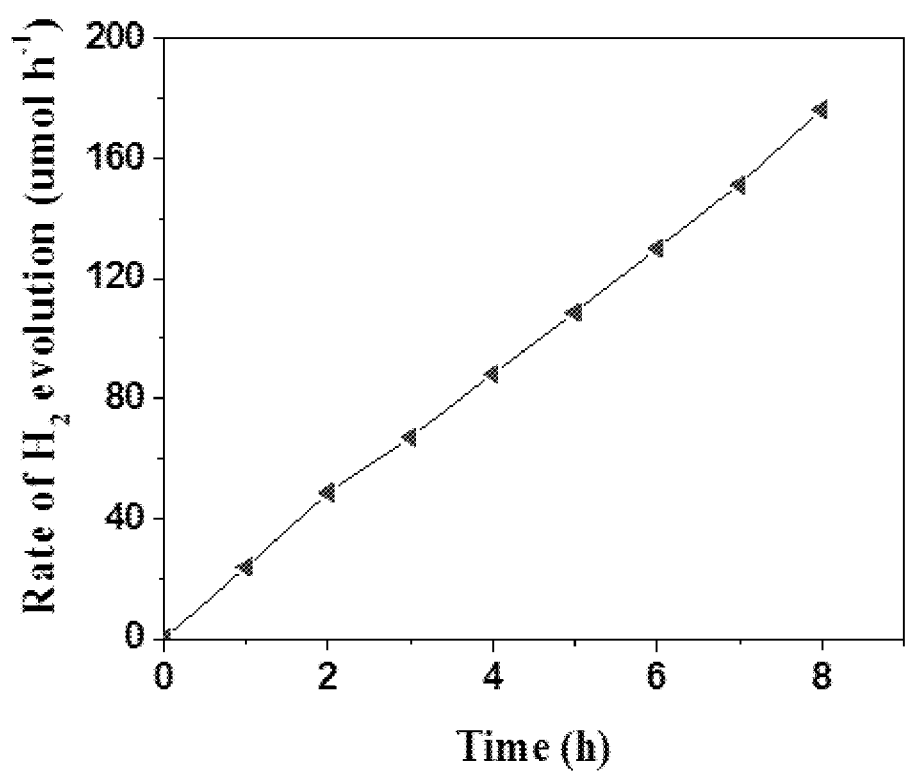
FIG. 14 is a plot illustrating the hydrogen production of a prepared $Bi_2S_3$—ZnS photocatalyst in comparison to time after 8 hours of irradiation.

The phototcatalytic activity for hydrogen production of the as-prepared $Bi_2S_3$—ZnS photocatalyst products was evaluated in an aqueous solution containing a mixture of $Na_2S$ and $Na_2SO_3$ under visible light irradiation. The photocatalytic activity results are further discussed below. FIG. 13 is a graph comparing photocatalytic hydrogen production activities from an aqueous solution containing a mixture of $Na_2S$ and $Na_2SO_3$ using $Bi_2S_3$ for comparison and $Bi_2S_3$—ZnS under visible light irradiation. FIG. 14 is a graph showing hydrogen gas production after 8 hours of irradiation. During the experiment, it was observed that the rate of hydrogen production for the catalysts increases with an increase in reaction which is likely due to the fact that the photons on the catalysts increase with an increasing irradiation time (FIG. 14). The $H_2$ gas production activity of pure $Bi_2S_3$ was also evaluated for the purpose of comparison. The activity of $Bi_2S_3$ under visible light is too low (13.15 μmol $h^{-1}$), suggesting that pure $Bi_2S_3$ is not a very good photocatalyst alone, likely due to rapid recombination of electron-hole pairs and poor separation of electron-hole pairs. However, after doping $Bi_2S_3$ with ZnS, the photocatalytic activity was enhanced (176.24 μmol $h^{-1}$) indicating that the activity is improved after incorporation of ZnS, likely due to effective charge separation (FIG. 13).

This may be attributed to the fact that the formation of heterostructures between ZnS and $Bi_2S_3$, improve the mobility of photogenerated electron-hole pairs and thus facilitates the charge transportation towards the surface of the catalyst, resulting in high activity. Under visible light irradiation, electron transitions occur simultaneously in both $Bi_2S_3$ and ZnS. Due to the difference in energy band gap positions, photoexcited electron transfer from the conduction band of $Bi_2S_3$ to that of ZnS is able to produce hydrogen, while holes are transferred from the valence band of ZnS to that of $Bi_2S_3$. FIG. 15 is a schematic illustration of this charge separation and transfer operations in the $Bi_2S_3$—ZnS photocatalyst. This property results in charge transfer separation of photogenerated electron-hole pairs and thus an enhancement in the photocatalytic hydrogen production activity. It is noted that the Na$_2$S and Na$_2$SO$_3$ mixture was used as a sacrificial agent (S$^{2-}$, SO$_3^{2-}$) and it consumed holes produced in the valence band.

In conclusion, a facile solvothermal method for the synthesis of chloroplast-like structures of Bi$_2$S$_3$—ZnS is demonstrated. It was observed that polyvinyl pyrrolidone played a significant role in the formation of chloroplast-like structures and the morphology of the product was tuned by adjusting the PVP concentration in the reaction mixture and the reaction time. The proposed formation mechanism provides insight into the morphology evolution. The doping of ZnS into Bi$_2$S$_3$ enhanced the separation and transportation of photogenerated electron-hole pairs; as a result the hydrogen evaluation rate was enhanced. It is envisioned that this work may provide insights for the synthesis of other semiconductors with controllable morphologies for visible-light driven photocatalysts and hydrogen production.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present invention is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A photocatalyst, comprising:
   bismuth (III) sulfide; and
   zinc sulfide;
   wherein the photocatalyst has a chloroplast-like morphology with an average length of 500-3000 nm and an average width of 100-500 nm and an average ratio of length to width that is greater than or equal to 2.0.

2. The photocatalyst of claim 1, wherein the atomic ratio of bismuth to zinc is in a range of 0.1-5.0.

3. The photocatalyst of claim 1, wherein the atomic ratio of sulfur to bismuth is in a range of 1.0-10.0.

4. The photocatalyst of claim 1, which is monodisperse and has a coefficient of variation of less than 30%.

5. The photocatalyst of claim 1, which has a molar ratio of bismuth (III) sulfide to zinc sulfide in a range of 1:10 to 10:1.

6. A method of forming the photocatalyst of claim 1, the method comprising:
   mixing a bismuth trihalide, a zinc salt, and a thiourea organosulfur compound in a solvent in the presence of polyvinyl pyrrolidone thereby forming a reaction slurry; and
   heating the reaction slurry in an autoclave at a temperature of 100-300° C. for a time period of 1-30 hours thereby forming the photocatalyst;
   wherein the average ratio of length to width of the photocatalyst increases as an amount of polyvinyl pyrrolidone present in the reaction slurry increases.

7. The method of claim 6, wherein the solvent is ethylene glycol.

8. The method of claim 6, wherein the bismuth trihalide is bismuth (III) chloride, the zinc salt is zinc acetate dihydrate, and the thiourea organosulfur compound is thiourea of formula SC(NH$_2$)$_2$.

9. The method of claim 6, wherein the heating is performed at a temperature of 180-220° C. for a time period of 16-24 hours.

10. The method of claim 6, wherein 1-50 g of polyvinyl pyrrolidone is present per liter of the reaction slurry.

11. The method of claim 6, wherein the molar ratio of the thiourea organosulfur compound to the bismuth trihalide is in a range of 2-10.

12. The method of claim 6, wherein the molar ratio of the zinc salt to the bismuth trihalide is in a range of 1.25-5.

13. The method of claim 6, wherein 5-25 g of polyvinyl pyrrolidone is present per liter of the reaction slurry and the average ratio of length to width of the photocatalyst is in a range of 2.5-5.0.

14. A method of forming hydrogen gas, the method comprising:
   contacting an aqueous solution with the photocatalyst of claim 1, thereby forming a reaction mixture; and
   irradiating the reaction mixture with a light source having a wavelength of 300-800 nm, thereby forming hydrogen gas.

15. The method of claim 14, wherein 0.1-5.0 grams of the photocatalyst is present per liter of the reaction mixture.

16. The method of claim 14, wherein the irradiating is performed in the presence of 0.1-1.0 moles of a hole scavenger or sacrificial agent per liter of the reaction mixture and an absence of oxygen.

17. The method of claim 16, wherein the hole scavenger or sacrificial agent is at least one selected from the group consisting of Na$_2$S and Na$_2$SO$_3$.

18. The method of claim 14, wherein hydrogen gas is formed at a rate of 50-300 μmol h$^{-1}$.

19. The method of claim 14, further comprising:
   recovering the photocatalyst after the hydrogen gas is produced; and
   recycling the recovered photocatalyst in at least two reaction cycles.

20. The method of claim 19, wherein the average rate of hydrogen gas formation decreases by less than 30% after the photocatalyst is recycled in at least two reaction cycles.

* * * * *